(12) United States Patent
Fukunaga et al.

(10) Patent No.: US 9,348,172 B2
(45) Date of Patent: May 24, 2016

(54) TRANSFLECTIVE LIQUID CRYSTAL DISPLAY DEVICE AND ELECTRONIC APPARATUS

(71) Applicant: Japan Display Inc., Tokyo (JP)

(72) Inventors: Yoko Fukunaga, Tokyo (JP); Masaya Tamaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 10 days.

(21) Appl. No.: 14/298,093

(22) Filed: Jun. 6, 2014

(65) Prior Publication Data

US 2015/0002796 A1 Jan. 1, 2015

(30) Foreign Application Priority Data

Jun. 28, 2013 (JP) ................................. 2013-137202

(51) Int. Cl.
*G02F 1/1335* (2006.01)
(52) U.S. Cl.
CPC .... *G02F 1/133555* (2013.01); *G02F 1/133514* (2013.01)
(58) Field of Classification Search
USPC .................................................. 349/114, 113
See application file for complete search history.

(56) References Cited

U.S. PATENT DOCUMENTS 6,281,952 B1 * 8/2001 Okamoto et al. ............... 349/12
6,882,389 B2 * 4/2005 Oshima et al. ................ 349/114
7,133,104 B2 * 11/2006 Kim et al. ..................... 349/147

FOREIGN PATENT DOCUMENTS

| JP | 2000-111724 A | 4/2000 |
|---|---|---|
| JP | 2003-121865 A | 4/2003 |
| JP | 2006-201799 A | 8/2006 |
| JP | 2009-093115 | 4/2009 |
| JP | 2012-255908 A | 12/2012 |
| KR | 20010005936 A | 1/2001 |
| KR | 20070041106 A | 4/2007 |
| TW | 200422658 A | 11/2004 |

OTHER PUBLICATIONS

Taiwanese Office Action mailed Jul. 29, 2015 for corresponding Taiwanese Application No. 103119949.
Korean Office Action mailed Jun. 1, 2015 for corresponding Korean Application No. 10-2014-0077385.

* cited by examiner

*Primary Examiner* — Lucy Chien
(74) *Attorney, Agent, or Firm* — Michael Best & Friedrich LLP

(57) ABSTRACT

According to an aspect, a transflective liquid crystal display device includes: a first substrate on which reflective electrodes are arranged for pixels; a second substrate on which a transparent electrode is provided; a liquid crystal layer between the first and the second substrates; and a color filter that is provided closer to the transparent electrode than the reflective electrodes, and includes filters of a plurality of colors. The first substrate is provided with a first space between reflective electrodes of adjacent pixels and a second space between reflective electrodes of adjacent pixels, the first space extending in a first direction and overlapping a border between filters of different colors, the second space extending in a second direction and having transmittance higher than that of the first space. Transmissive display is performed by using the second space where a light shielding member is not positioned.

11 Claims, 38 Drawing Sheets

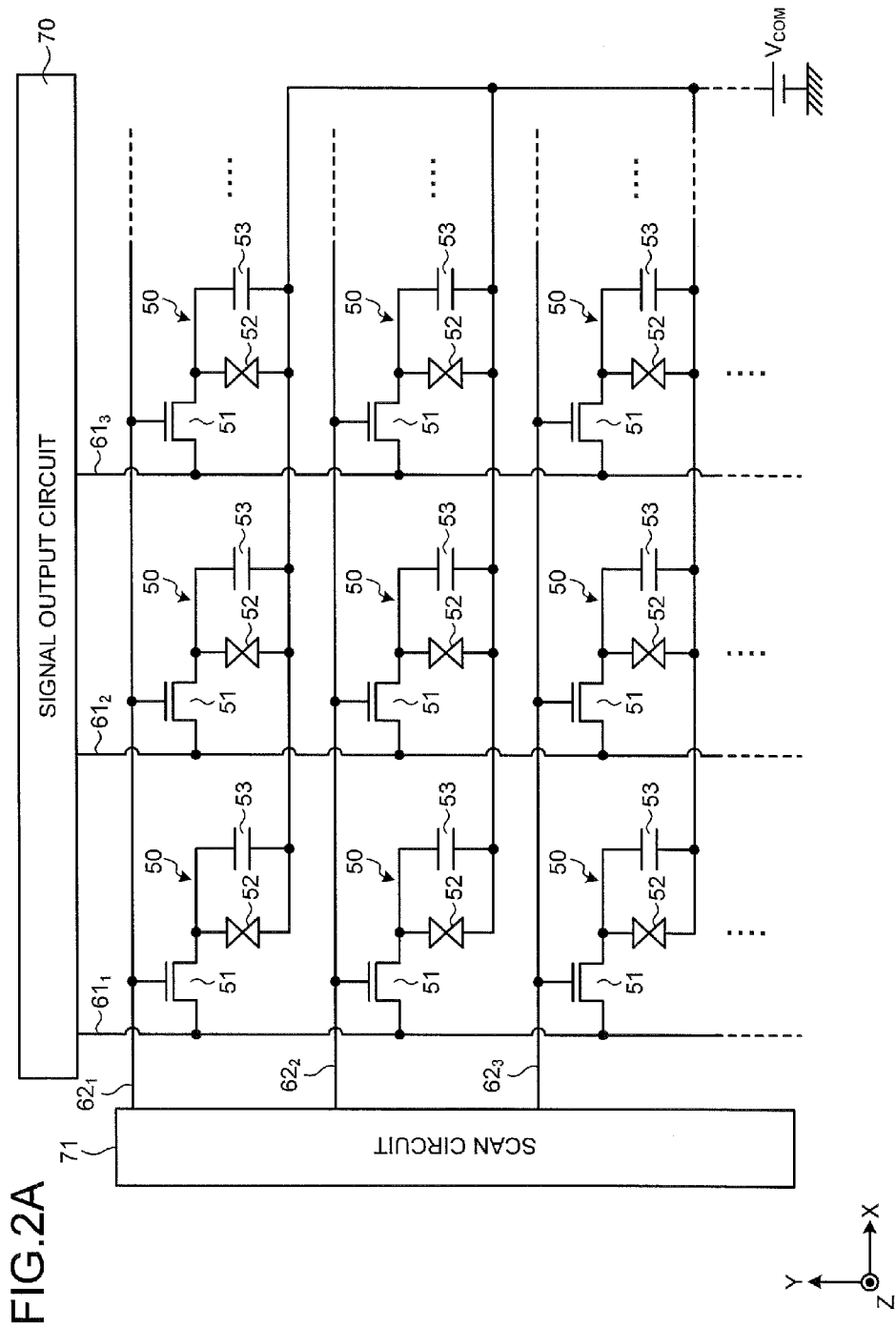

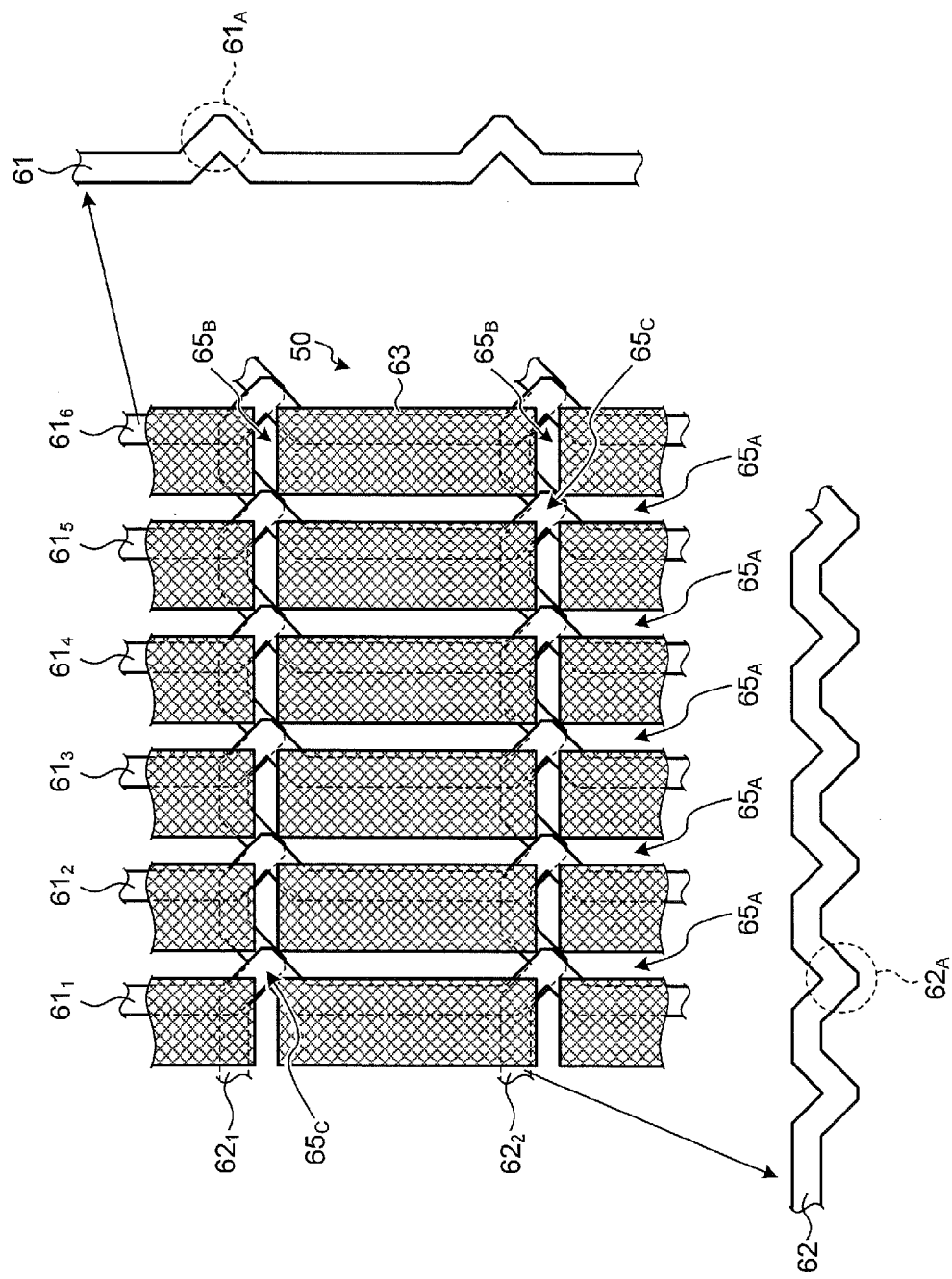

141 UPPER HOUSING
144 DISPLAY DEVICE
142 LOWER HOUSING

141 UPPER HOUSING
142 LOWER HOUSING

TRANSFLECTIVE LIQUID CRYSTAL DISPLAY DEVICE AND ELECTRONIC APPARATUS

CROSS-REFERENCE TO RELATED APPLICATIONS

This application claims priority from Japanese Application No. 2013-137202, filed on Jun. 28, 2013, the contents of which are incorporated by reference herein in its entirety.

BACKGROUND

1. Technical Field

The present disclosure relates to a transflective liquid crystal display device and an electronic apparatus including the same.

2. Description of the Related Art

Display devices include transmissive display devices that perform display by using transmitted light of backlight light from behind a screen and reflective display devices that perform display by using reflected light of external light. Transmissive display devices are characterized by high saturation and an easy-to-view screen even in a dark environment. Reflective display devices are characterized by low power consumption and an easy-to-view screen even in a bright environment.

Examples of a display device having the characteristics of both a transmissive display device and a reflective display device include a transflective liquid crystal display device which has a transmissive display area (transmissive display portion) and a reflective display area (reflective display portion) in a single pixel (for example, see Japanese Patent Application Laid-open Publication No. 2009-93115). A transflective liquid crystal display device performs display by using transmitted light of backlight light in a dark environment, and performs display by using reflected light of external light in a bright environment.

Transflective liquid crystal display devices have a screen easy to view both in a bright environment and in a dark environment, and have low power consumption. Transflective liquid crystal display devices are therefore used as a display section of electronic apparatuses, or electronic apparatuses of portable type (portable electronic apparatuses) frequently used outdoors in particular. Examples of the portable electronic apparatuses include portable information apparatuses such as a digital camera, portable communication apparatuses such as a mobile phone, etc.

For a transflective liquid crystal display device, there is a trade-off between securing transmissive display areas and maintaining reflective display performance. If large transmissive display areas are secured to improve transmissive display performance, reflective display areas need to be reduced accordingly with a drop in the reflective display performance. To maintain reflective display performance equivalent to that of a reflective display device, large reflective display areas need to be secured and the transmissive display performance deteriorates accordingly.

For the foregoing reasons, there is a need for a transflective liquid crystal display device that can achieve transmissive display while maintaining reflective display performance equivalent to that of a reflective display device, and an electronic apparatus including the same.

SUMMARY

According to an aspect, a transflective liquid crystal display device comprising: a plurality of reflective electrodes that are arranged for a plurality of pixels, respectively; a first substrate on which the reflective electrodes are arranged; a transparent electrode that is opposed to the reflective electrodes; a second substrate on which the transparent electrode is provided; a liquid crystal layer that is provided between the first substrate and the second substrate; and a color filter that is provided closer to the transparent electrode than the reflective electrodes, and includes filters of a plurality of colors, the filters of the respective colors being arranged corresponding to the pixels. The first substrate is provided with a first space between reflective electrodes of adjacent pixels and a second space between reflective electrodes of adjacent pixels, the first space extending in a first direction and overlapping a border between filters of different colors of the color filter, the second space extending in a second direction intersecting the first direction and having transmittance higher than that of the first space. The first substrate includes a light shielding member that is positioned in an entire area of the first space. Reflective display is performed by using the reflective electrodes, and transmissive display is performed by using the second space where the light shielding member is not positioned.

BRIEF DESCRIPTION OF THE DRAWINGS

FIG. 2A is a circuit diagram illustrating a basic pixel circuit;

FIG. 33 is a plan view illustrating an electrode structure of a pixel part according to a modification;

DETAILED DESCRIPTION

Figure 1:
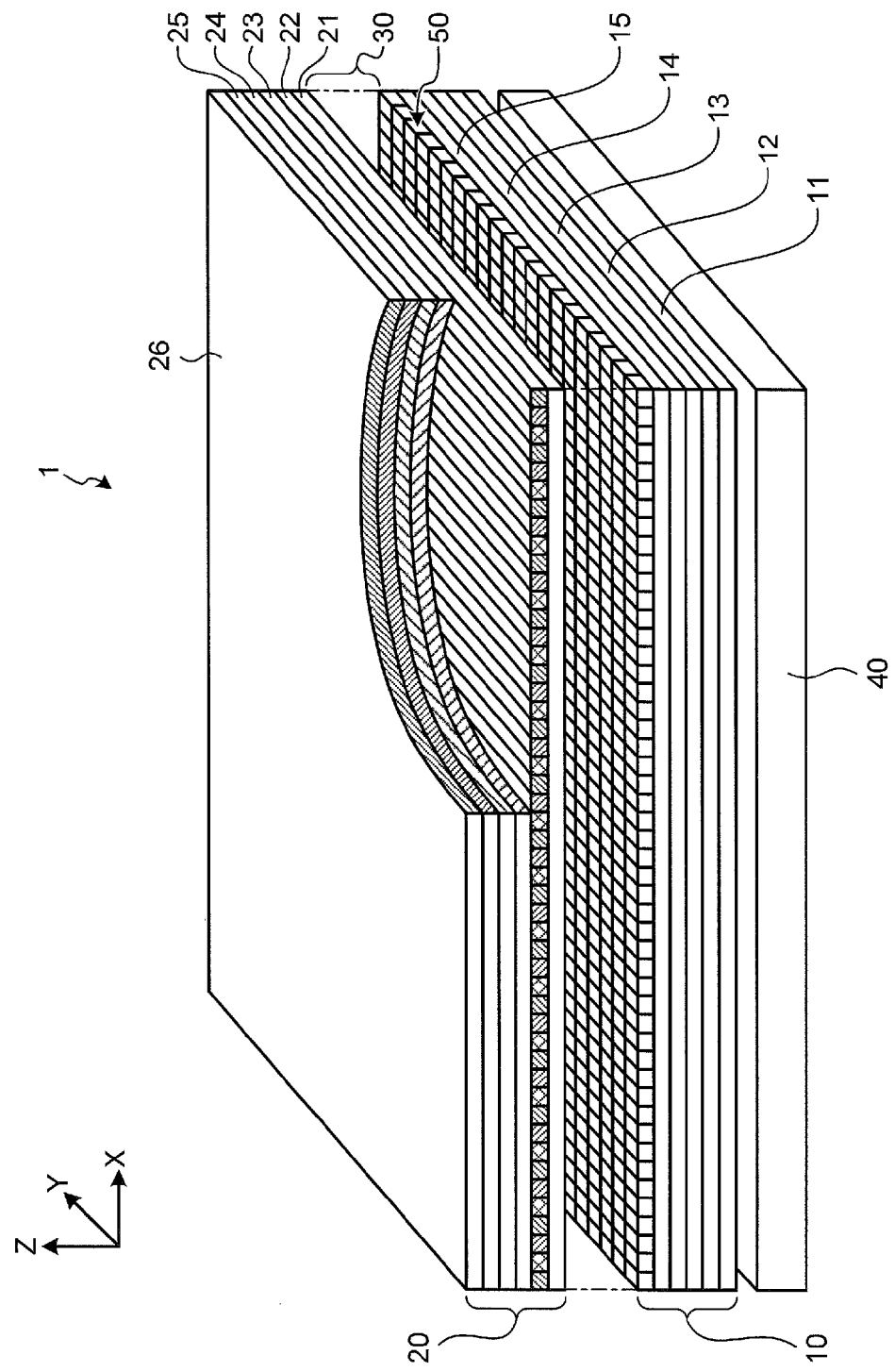
FIG. 1 is a perspective view schematically illustrating a configuration of a transflective liquid crystal display device to which the present disclosure is applied, as cut away in part.

A mode (hereinafter, referred to as an "embodiment") for carrying out a technology of the present disclosure will be described in detail below with reference to the drawings in the following procedure:
1. Transflective Liquid Crystal Display Device to Which the Present Disclosure is Applied
    1-1. Transflective Liquid Crystal Display Device Capable of Color Display
    1-2. Basic Pixel Circuit
    1-3. Pixels and Sub-pixels
    1-4. Discussion on Electrode Structure of Pixel Part
2. Description of Embodiment
    2-1. Method for Driving Liquid Crystal Display Panel
    2-2. MIP Technology
    2-3. Display Mode
    2-4. Overlapping of Color Filters
    2-5. Orientation of Liquid Crystal Molecules
    2-6. Scattering Layer
    2-7. Positions of Transmissive Areas
    2-8. Display Mode of Liquid Crystal
    2-9. Specific Example 3. Modification
4. Electronic Apparatuses
5. Aspects of the Present Disclosure

1. Transflective Liquid Crystal Display Device to Which the Present Disclosure is Applied The technology of the present disclosure can be applied to a display device of flat panel type (flat type). Examples of the display device of flat panel type include, but are not limited to, a display device using a liquid crystal display (LCD) panel, a display device using an electro luminescence (EL) display panel, a display device using a plasma display (PD) panel, etc.

In terms of display modes, such display devices of flat panel type can be classified into transmissive, reflective, and transflective display devices. The technique of the present disclosure can be applied to a transflective liquid crystal display device which has the characteristics of both a transmissive display device and a reflective display device. In other words, the technique of the present disclosure can be applied to a transflective liquid crystal display device which has a screen easy to view both in a bright environment and in a dark environment and has low power consumption. The transflective liquid crystal display device having such characteristics is suitably used as a display unit of an electronic apparatus, or an electronic apparatus of portable type frequently used outdoors, i.e., a portable electronic apparatus in particular. Examples of the portable electronic apparatus include, but are not limited to, a portable information apparatus such as a digital camera, a portable communication apparatus such as a mobile phone, etc.

The transflective liquid crystal display device to which the present disclosure is applied may be a display device capable of monochrome display or a display device capable of color display. If the display device is capable of color display, each pixel (unit pixel) serving as a unit for forming a color image includes a plurality of sub-pixels. More specifically, a unit pixel of the display device capable of color display includes, for example, three sub-pixels including a sub-pixel for displaying red (R), a sub-pixel for displaying green (G), and a sub-pixel for displaying blue (B).

It should be noted that a pixel is not limited to the combination of the sub-pixels of the three primary colors R, G, and B. For example, a unit pixel may further include a sub-pixel or sub-pixels of one or a plurality of colors in addition to the sub-pixels of the three primary colors R, G, and B. More specifically, for example, a sub-pixel for displaying white (W) may be added to a unit pixel for improved luminance. At least one sub-pixel for displaying complementary color may be added to a unit pixel for an extended range of color reproduction.

1-1. Transflective Liquid Crystal Display Device Capable of Color Display

A transflective liquid crystal display device to which the present disclosure is applied will be described below with reference to the drawings by exemplifying a transflective liquid crystal display device capable of color display.

As illustrated in FIG. 1, a transflective liquid crystal display device 1 to which the present disclosure is applied includes a first panel unit 10, a second panel unit 20, a liquid crystal layer 30, and a backlight unit 40 as its main components. A front side of the second panel unit 20 serves as a display surface side of the transflective liquid crystal display device 1. The first panel unit 10 and the second panel unit 20 are opposed to each other with a predetermined gap therebetween. Liquid crystal material is sealed in the gap between the first panel unit 10 and the second panel unit 20, whereby the liquid crystal layer 30 is formed.

The first panel unit 10 includes a polarization plate 11, a half-wave plate 12, a quarter-wave plate 13, a first substrate 14 made of transparent glass or the like as a substrate material, and a planarization film 15, which are arranged in order from the side opposite to the liquid crystal layer 30, i.e., from the side of the backlight unit 40.

A plurality of signal lines and a plurality of scan lines, neither of which is illustrated, are formed on the first substrate 14 of the first panel unit 10 so as to intersect each other. Sub-pixels (hereinafter, sometimes referred to simply as "pixels") 50 are two-dimensionally arranged in a matrix at the intersections of the plurality of signal lines and the plurality of scan lines.

Circuit elements are further formed on the first substrate 14 with respect to the respective pixels 50. The circuit elements include switching elements such as a thin film transistor (TFT), and capacitive elements, etc. The planarization film 15 is formed over the surfaces of the circuit elements, the signal lines, and the scan lines, whereby the surface of the first panel unit 10 is planarized. Reflective electrodes to be described later are formed on the planarization film 15 with respect to the respective pixels 50. Since the circuit elements including TFTs are formed thereon, the first substrate 14 is sometimes called a TFT substrate.

The plurality of signal lines are wiring for transmitting signals (display signals/video signals) for driving the pixels 50. The plurality of signal lines have a wiring structure of extending in an aligning direction of the pixels in pixel columns of the matrix arrangement of the pixels 50, i.e., in a column direction (Y direction in FIG. 1) for each pixel column. The plurality of scan lines are wiring for transmitting signals (scan signals) for selecting the pixels 50 row by row. The plurality of scan lines have a wiring structure of extending in an aligning direction of the pixels in pixel rows of the matrix arrangement of the pixels 50, i.e., in a row direction (X direction in FIG. 1) for each pixel row. The X direction and the Y direction are orthogonal to each other.

The second panel unit 20 includes a transparent electrode 21 made of indium tin oxide (ITO) or the like, a color filter 22, a second substrate 23 made of transparent glass or the like as a substrate material, a quarter-wave plate 24, a half-wave plate 25, and a polarization plate 26, which are arranged in order from the side of the liquid crystal layer 30.

For example, the color filter 22 of the second panel unit 20 is configured such that red (R), green (G), and blue (B) filters of stripe shape extending in the column direction (Y direction) are repeatedly arranged at the same pitch as the pitch of the pixels 50 in the row direction (X direction). Since the second substrate 23 is provided with the color filter (CF) 22, the second substrate 23 is sometimes called a CF substrate.

The first panel unit 10, the second panel unit 20 opposed to the first panel unit 10, and the liquid crystal layer 30 arranged between the first panel unit 10 and the second panel unit 20 described above constitute a transflective liquid crystal display panel. The top surface (front surface) of the second panel unit 20 is the display surface.

The backlight unit 40 is an illumination unit that illuminates the liquid crystal display panel from behind the liquid crystal display panel, or more specifically, from the side of the first panel unit 10 opposite to the liquid crystal layer 30. The backlight unit 40 is not limited to any particular structure or components. For example, the backlight unit 40 may include a light source such as a light emitting diode (LED) or a fluorescent lamp, and a known member or members such as a prism sheet, a diffusion sheet, and a light guide plate.

In the transflective liquid crystal display device 1 having the foregoing configuration, the pixels 50 each include a reflective display area (reflective display portion) and a transmissive display area (transmissive display portion). As described above, the reflective display areas include reflective electrodes formed on the surface of the planarization film 15 with respect to the respective pixels 50. The reflective display areas reflect external light transmitted through the second panel unit 20 and incident from outside with the reflective electrodes, and perform display by using the reflected light. The transmissive display areas transmit light from the backlight unit 40 and perform display by using the transmitted light. The transmissive display areas arranged for the respective pixels 50 will be described in detail later.

1-2. Basic Pixel Circuit

Next, a basic pixel circuit of the pixels 50 will be described with reference to FIG. 2A. The direction denoted by X (X direction) in FIG. 2A indicates the row direction of the transflective liquid crystal display device 1 illustrated in FIG. 1. The direction denoted by Y (Y direction) indicates the column direction.

As illustrated in FIG. 2A, a plurality of signal lines 61 ($61_1$, $61_2$, $61_3$, ...) and a plurality of scan lines 62 ($62_1$, $62_2$, $62_3$, ...) are arranged so as to intersect each other. The pixels 50 are arranged at the intersections. The direction in which the plurality of scan lines 62 ($62_1$, $62_2$, $62_3$, ...) extend is the row direction (X direction). The direction in which the plurality of signal lines 61 ($61_1$, $61_2$, $61_3$, ...) extend is the column direction (Y direction). As described previously, the plurality of signal lines 61 and the plurality of scan lines 62 are formed on the surface of the first substrate (TFT substrate) 14 of the first panel unit 10. One ends of the plurality of signal lines 61 ($61_1$, $61_2$, $61_3$, ...) are each coupled to output terminals of a signal output circuit 70 corresponding to the respective columns. One ends of the plurality of scan lines 62 ($62_1$, $62_2$, $62_3$, ...) are each coupled to output terminals of a scan circuit 71 corresponding to the respective rows.

The pixels 50 each include, for example, a pixel transistor 51 using a thin film transistor (TFT), a liquid crystal capacitor 52, and a holding capacitor 53. The gate electrode of the pixel transistor 51 is coupled to a scan line 62 ($62_1$, $62_2$, $62_3$, ...). The source electrode is coupled to a signal line 61 ($61_1$, $61_2$, $61_3$, ...).

The liquid crystal capacitor 52 represents a capacitive component of the liquid crystal material occurring between a pixel electrode and a counter electrode (corresponding to the transparent electrode 21 in FIG. 1) formed opposite to the pixel electrode. The pixel electrode is coupled to the drain electrode of the pixel transistor 51. In the case of color display, the pixel electrode corresponds to the reflective electrode formed for each sub-pixel. In the case of monochrome display, the pixel electrode corresponds to the reflective electrode formed for each pixel. A common potential $V_{COM}$ of a direct-current voltage is applied to the counter electrodes of the liquid crystal capacitors 52 of all the pixels in common. One electrode of the holding capacitor 53 is coupled to the pixel electrode of the liquid crystal capacitor 52. The other electrode of the holding capacitor 53 is coupled to the counter electrode of the liquid crystal capacitor 52.

It is clear from the foregoing pixel circuit that the plurality of signal lines 61 ($61_1$, $61_2$, $61_3$, ...) are wiring for transmitting signals for driving the pixels 50, namely, video signals output from the signal output circuit 70 to the pixels 50 pixel column by pixel column. The plurality of scan lines 62 ($62_1$, $62_2$, $62_3$, ...) are wiring for transmitting signals for selecting the pixels 50 row by row, namely, scan signals output from the scan circuit 71 pixel row by pixel row.

1-3. Pixels and Sub-Pixels

Figure 2B:
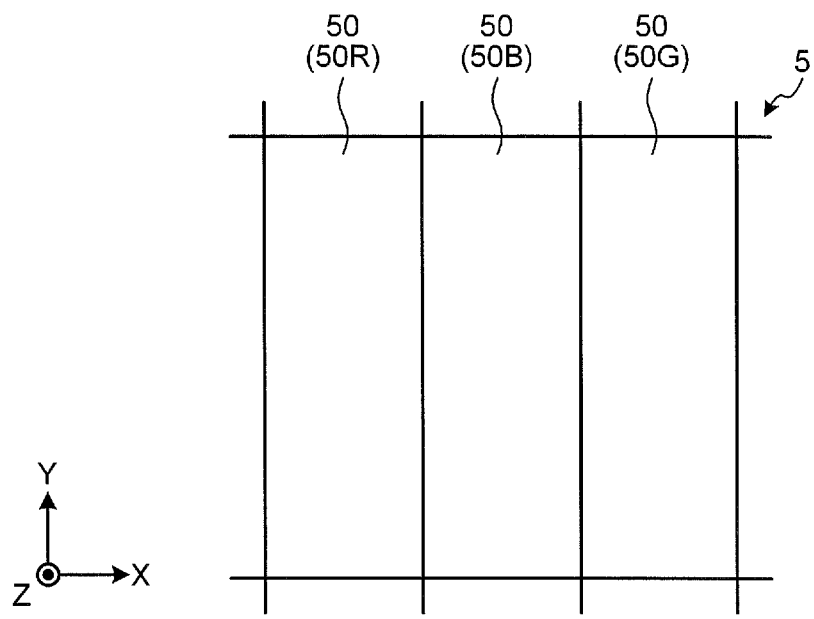
FIG. 2B is a schematic diagram illustrating pixels in color display.
Figure 2C:
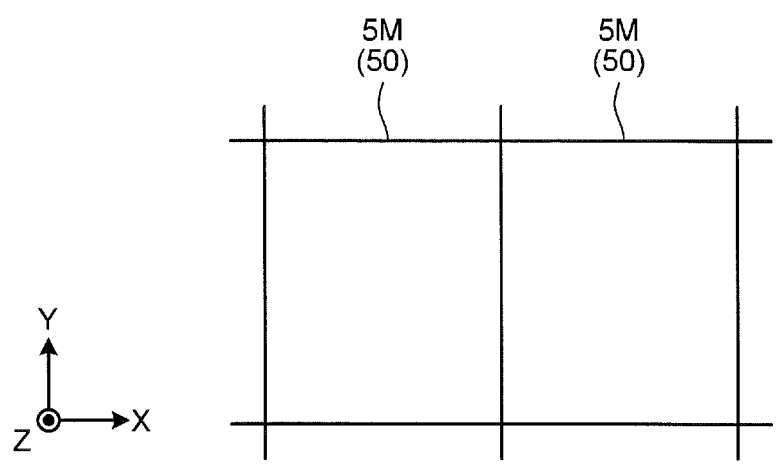
FIG. 2C is a schematic diagram illustrating pixels in monochrome display.

If the transflective liquid crystal display device 1 is capable of color display, as illustrated in FIG. 2B, a pixel serving as a unit for forming a color image, i.e., a unit pixel 5 includes, for example, a plurality of sub-pixels 50. In this example, the unit pixel 5 includes a sub-pixel 50R for displaying R, a sub-pixel 50B for displaying B, and a sub-pixel 50G for displaying G. The sub-pixels 50R, 50B, and 50G included in the unit pixel 5 are arranged in the X direction, i.e., the row direction of the transflective liquid crystal display device 1. As described above, the unit pixel 5 may further include a sub-pixel or sub-pixels of one or a plurality of colors. If the transflective liquid crystal display device 1 is only capable of monochrome display, as illustrated in FIG. 2C, a pixel serving as a unit for forming a monochrome image, i.e., a unit pixel 5M includes a pixel 50 (corresponding to a sub-pixel 50 of a color image). The unit pixel 5 is a basic unit for displaying a color image. The unit pixel 5M is a basic unit for displaying a monochrome image.

Figure 2D:
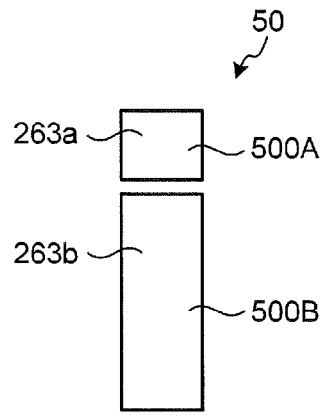
FIG. 2D is a schematic diagram illustrating an example of a configuration of sub-pixels.
Figure 2E:
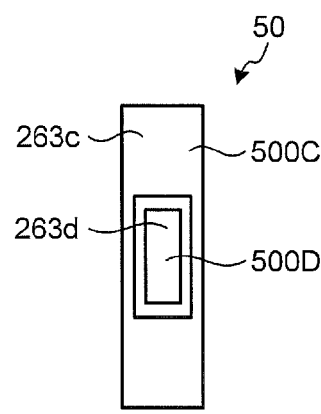
FIG. 2E is a schematic diagram illustrating an example of a configuration of sub-pixels.
Figure 2F:
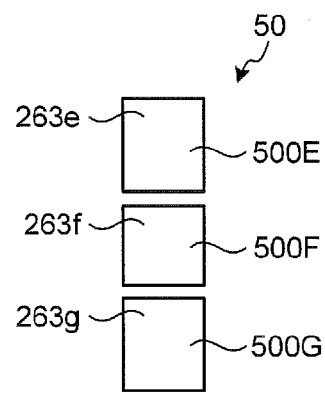
FIG. 2F is a schematic diagram illustrating an example of a configuration of sub-pixels.

Each sub-pixel 50 may be divided into a plurality of sub sub-pixels (pixels). In such a case, the reflective electrode is divided into a plurality of reflective electrodes corresponding to the sub sub-pixels. The sub-pixel 50 can perform area coverage modulation display by coupling the pixel electrodes (reflective electrodes) of the plurality of sub sub-pixels to a signal line 61 and a scan line 62 via respective different drive circuits. For example, if the reflective electrodes of a plurality of sub sub-pixels have an area ratio of 2:1, the sub-pixel 50 can perform two bits of area coverage modulation: 0, 1, 2, and 3. The sub-pixel 50 illustrated in FIG. 2D includes a sub sub-pixel 500A including a reflective electrode 263a, and a sub sub-pixel 500B including a reflective electrode 263b that has an area approximately twice that of the reflective electrode 263a. The sub sub-pixels 500A and 500B are arranged in parallel. The reflective electrodes 263a and 263b of the sub sub-pixels 500A and 500B are coupled to a signal line 61 and a scan line 62 via respective different drive circuits. As illustrated in FIG. 2E, the sub-pixel 50 may include a sub sub-pixel 500C including a reflective electrode 263c in which an opening is formed, and a sub sub-pixel 500D including a reflective electrode 263d which is arranged in the opening of the reflective electrode 263c. For example, as illustrated in FIG. 2F, the sub-pixel 50 may include sub sub-pixels 500E, 500F, and 500G including reflective electrodes 263e, 263f, and 263g having the same area, respectively. The sub sub-pixels 500E, 500F, and 500G are arranged in a line. In the case of the sub-pixel illustrated in FIG. 2F, the reflective electrode 263e of the sub sub-pixel 500E and the reflective electrode 263g of the sub sub-pixel 500G among the three sub sub-pixels are electrically coupled to each other and coupled to a signal line 61 and a scan line 62 via a single drive circuit. The reflective electrode 263f of the remaining sub sub-pixel 500F is coupled to the signal line 61 and the scan line 62 via another drive circuit. Such coupling allows two bits of area coverage modulation in a balanced manner.

1-4. Discussion on Electrode Structure of Pixel Part

Before describing the transmissive display areas, the electrode structure of the pixels 50 will be discussed.

Figure 3A:
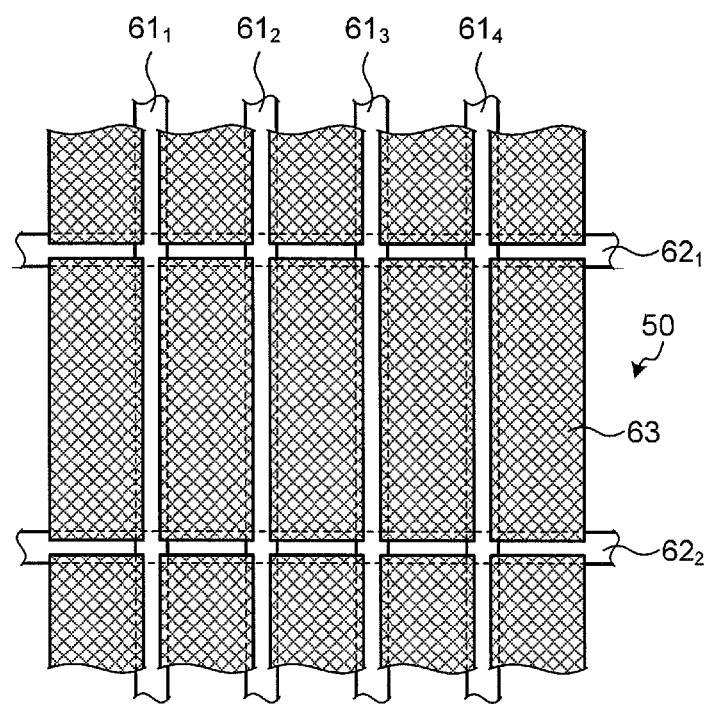
FIG. 3A is a plan view of a pixel part of a reflective liquid crystal display device.
Figure 3B:
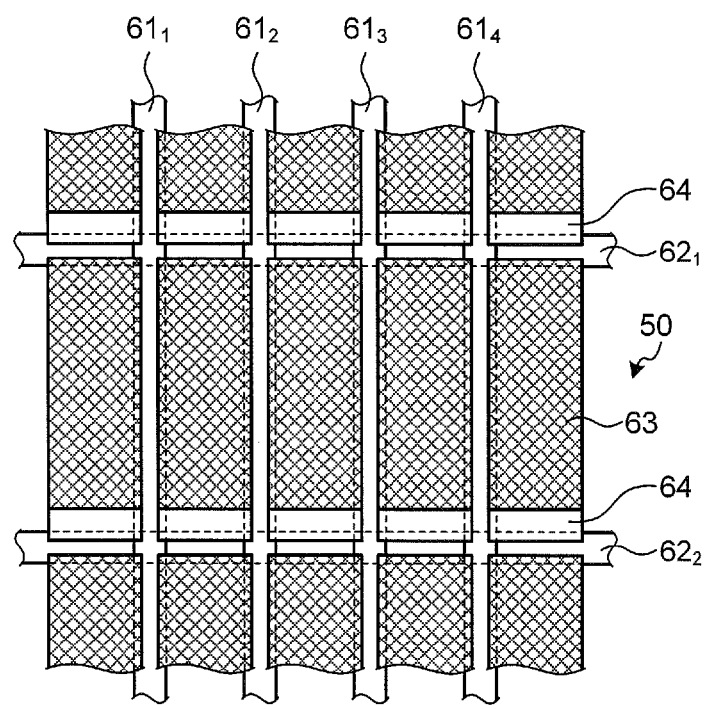
FIG. 3B is a plan view of a pixel part of a transflective liquid crystal display device.

FIGS. 3A and 3B are diagrams for describing electrode structures of conventional pixel parts. FIG. 3A illustrates a plan view of a pixel part of a reflective (totally reflective) liquid crystal display device. FIG. 3B illustrates a plan view of a pixel part of a conventional transflective liquid crystal display device. In FIGS. 3A and 3B, reflective electrodes 63 are illustrated crosshatched.

As illustrated in FIGS. 3A and 3B, the pixel part of a liquid crystal display device typically includes pixels 50 arranged in a matrix. Signal lines 61 are laid in spatial positions between the pixels 50, extending in the column direction of the matrix arrangement. Scan lines 62 are laid in spatial positions between the pixels 50, extending in the row direction. As described previously, in FIG. 1, the signal lines 61 and the scan lines 62 are laid on the first substrate 14 of the first panel unit 10 so as to intersect each other.

In the reflective liquid crystal display device illustrated in FIG. 3A, the reflective electrodes 63 in the pixel part (pixel array part) of such a configuration are made of metal such as aluminum, with substantially the same size as that of the pixels 50. The areas of the reflective electrodes 63 serve as reflective display areas. The reflective liquid crystal display device provides desired reflection display performance by securing the reflective display areas having substantially the same size as that of the pixels 50.

The conventional transflective liquid crystal display device illustrated in FIG. 3B has a reflective electrode 63 and an opening 64 in each pixel 50. The opening 64 is used as a transmissive display area. Since the opening 64 is formed in the pixel 50 to secure a transmissive display area, the reflective electrode 63, i.e., the reflective display area needs to be made smaller as much as the area of the opening 64. This lowers the reflective display performance of the conventional transflective liquid crystal display device as compared to that of a reflective liquid crystal display device. In other words, there is a trade-off between securing the transmissive display areas and maintaining the reflective display performance.

2. Description of Embodiment

Figure 4A:
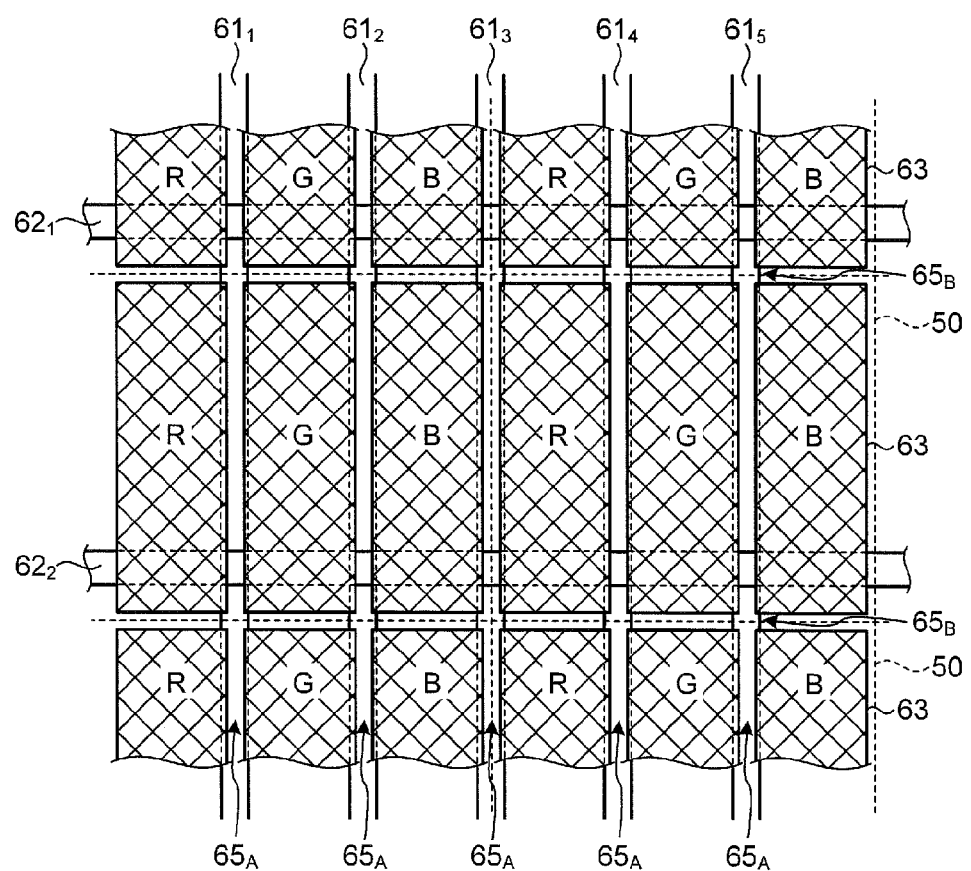
FIG. 4A is a plan view illustrating an electrode structure of a pixel part according to an embodiment.

To achieve transmissive display while maintaining reflective display performance equivalent to that of a reflective display device, the transflective liquid crystal display device 1 according to an embodiment of the present disclosure performs transmissive display by using spaces between the reflective electrodes 63 of adjacent pixels 50. Hereinafter, "spaces between the reflective electrodes of adjacent pixels" is referred to as "spaces between the reflective electrodes" or "spaces between the pixels", if needed. Specifically, as illustrated in FIG. 4A, in the pixel part where the pixels 50 are arranged in a matrix, the wiring including the signal lines 61 and the scan lines 62 is formed not to block spaces between the reflective electrodes 63 in a predetermined direction. As a result, transmissive display can be performed by using the spaces in the predetermined direction as transmissive display areas. More specifically, the wiring is formed to block spaces in a direction (first direction) in which the spaces overlap the borders between the filters of different colors of the color filter between the reflective electrodes 63 and have lower transmittance than spaces in other directions, and not to block spaces extending in a direction (second direction) intersecting the first direction. As a result, transmissive display can be performed by using the spaces in the second direction as transmissive display areas.

In FIG. 4A, the reflective electrodes 63 are illustrated crosshatched. The spaces between the reflective electrodes 63 include spaces $65_A$ extending in the direction of arrangement of the pixels in the pixel columns, i.e., the column direction (Y direction), and spaces $65_B$ extending in the direction of arrangement of the pixels in the pixel rows, i.e., the row direction (X direction). In the present example, the signal lines 61 and the scan lines 62 are described as an example of the wiring formed in the pixel part. However, the wiring formed in the pixel part is not limited thereto. As employed herein, the wiring includes all drive lines (control lines) needed to drive (control) the pixels 50.

"Not to block a space" does not exclude the presence of areas where the wiring overlaps the spaces $65_A$ and/or $65_B$ between the reflective electrodes 63. Specifically, the concept "not to block a space" covers situations where a signal line 61 laid in the column direction overlaps a space $65_B$ extending in the column direction, and where a scan line 62 laid in the row direction overlaps a space $65_A$ extending in the column direction.

The concept "not to block a space" also covers situations where a signal line 61 overlaps part of or partially overlaps a space $65_A$ extending in the column direction, and where a scan line 62 overlaps part of or partially overlaps a space $65_B$ extending in the row direction. In any case, areas where none of the signal lines 61 and the scan lines 62 overlaps the spaces $65_A$ or $65_B$ are used as transmissive display areas.

To form wiring not to block the spaces $65_B$ between the reflective electrodes 63, it is desirable to form the wiring to avoid the spaces $65_B$ between the reflective electrodes 63. "To avoid the spaces" refers to a state that there is no wiring in the spaces $65_B$ between the reflective electrodes 63 (in other words, the spaces $65_B$ include no area where the wiring overlaps).

Specifically, as illustrated in FIG. 4A, the scan lines 62 are laid to avoid the spaces $65_B$ extending in the row direction, i.e., without an area overlapping the spaces $65_B$. The signal lines 61 ($61_1$, $61_2$, $61_3$, $61_4$, and $61_5$) are arranged in the entire areas overlapping the spaces $65_A$ so that the spaces $65_A$ are blocked by the signal lines 61. In the present embodiment, the spaces $65_A$ overlap the borders between the filters of different colors of the color filter between the reflective electrodes 53 and serve as the spaces in the direction of low transmittance (first direction). The spaces $65_B$ extend in the direction (second direction) intersecting the first direction and serve as the spaces in the direction of higher transmittance than the first direction. Since there is no area overlapping the signal lines 61 or the scan lines 62 in the spaces $65_B$ between the reflective electrodes 63, the entire areas of the spaces $65_B$ can be used as transmissive display areas. The transflective liquid crystal display device 1 can thus provide higher transmissive display performance. The spaces $65_A$ between the reflective electrodes 63 can be blocked by the signal lines 61 to stabilize optical characteristics.

As described above, the transflective liquid crystal display device 1 performs transmissive display by using the spaces $65_B$ between the reflective electrodes 63. In other words, the areas of the spaces $65_B$ serve as transmissive display areas. This eliminates the need to secure additional transmissive display areas in the pixels 50. As is clear from a comparison between FIGS. 3A and 4A, the transflective liquid crystal display device 1 can be configured so that the reflective electrodes 63 have a dimension equivalent to that of reflective electrodes a reflective liquid crystal display device when the pixels 50 have the same size. As a result, the transflective liquid crystal display device 1 can achieve transmissive display while maintaining reflective display performance equivalent to that of a reflective display device. Blocking the spaces $65_A$ between the reflective electrodes 63 by the signal lines 61 can stabilize optical characteristics. This will be described later.

Figure 4B:
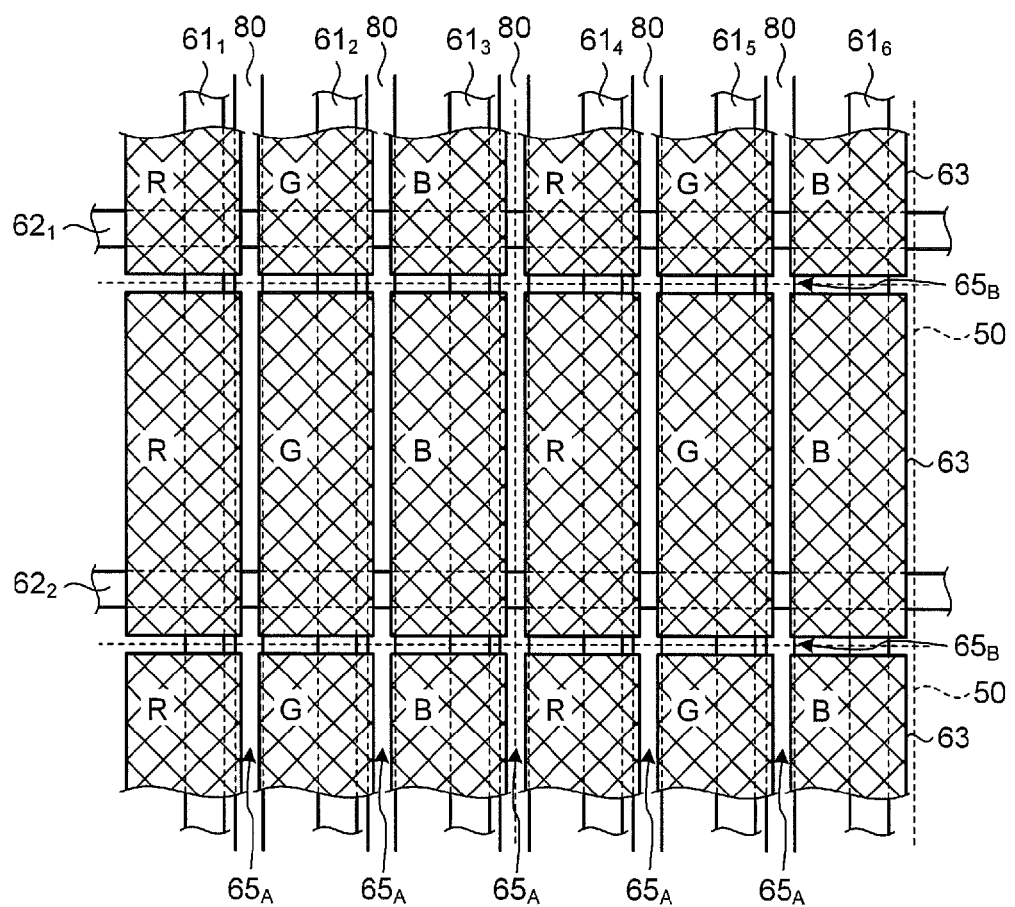
FIG. 4B is a plan view illustrating another electrode structure of the pixel part according to the embodiment.

In the example illustrated in FIG. 4A, the spaces $65_A$ are blocked by the signal lines 61. However, the present disclose is not limited thereto. As illustrated in FIG. 4B, the transflective liquid crystal display device 1 may be configured so that the signal lines 61 are arranged in positions off the spaces $65_A$, i.e., in positions not to block the spaces $65_A$. The spaces $65_A$ may be blocked by light shielding members 80 different from the signal lines 61. The light shielding members 80 may be made of wiring of the liquid crystal display panel, or more specifically, wiring formed on the same substrate as the reflective electrodes are. Metal wiring is desirably used as the wiring. Light reflecting members may be used as the light shielding members, in which case more light can be reflected during reflective display. The light shielding members only have to be able to shield light transmission during transmissive display, and may be a light absorbing filter.

2-1. Method for Driving Liquid Crystal Display Panel

The liquid crystal display panel (liquid crystal display device) employs a driving method of inverting the polarities of the video signals with respect to the common potential $V_{COM}$ at predetermined intervals. The purpose is to suppress degradation of the specific resistance (resistance inherent to material) and the like of the liquid crystals due to continuous application of a direct-current voltage of the same polarity to the liquid crystal.

Known examples of such a driving method of the liquid crystal display panel include a line inversion driving method, a dot inversion driving method, and frame inversion driving method. The line inversion driving method refers to a driving method of inverting the polarities of the video signals at time intervals of 1H (H is a horizontal period) equivalent to one line (one pixel row). The dot inversion driving method refers to a driving method of alternately inverting the polarities of the video signals between adjacent top, bottom, right, and left pixels. The frame inversion driving method refers to a driving method of inverting the video signals to be written to all the pixels to the same polarities at the same time in each frame equivalent to one screen.

In the present embodiment, the transflective liquid crystal display device 1 may employ any one of the foregoing driving methods. The frame inversion driving method is more preferably employed than the line inversion and dot inversion driving methods from the following reason.

Figure 5A:
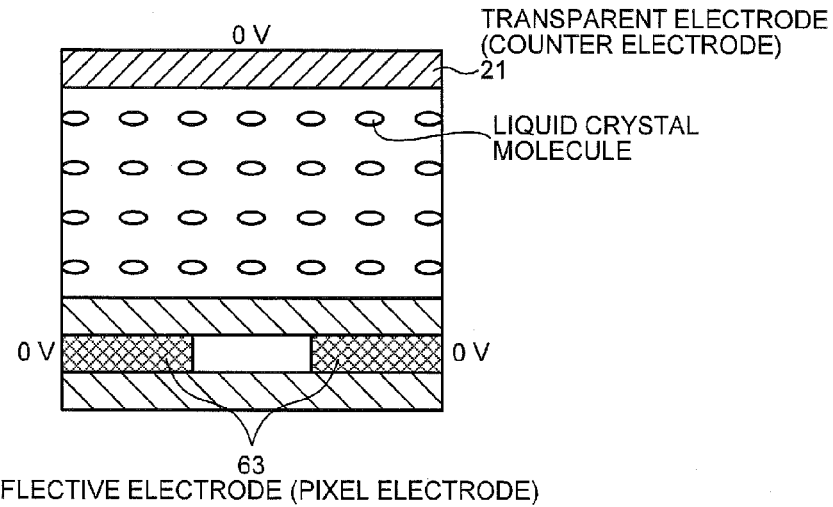
FIG. 5A is a diagram illustrating a result of simulation when no voltage is applied, concerning the reason why a frame inversion driving method is desirably employed.
Figure 5B:
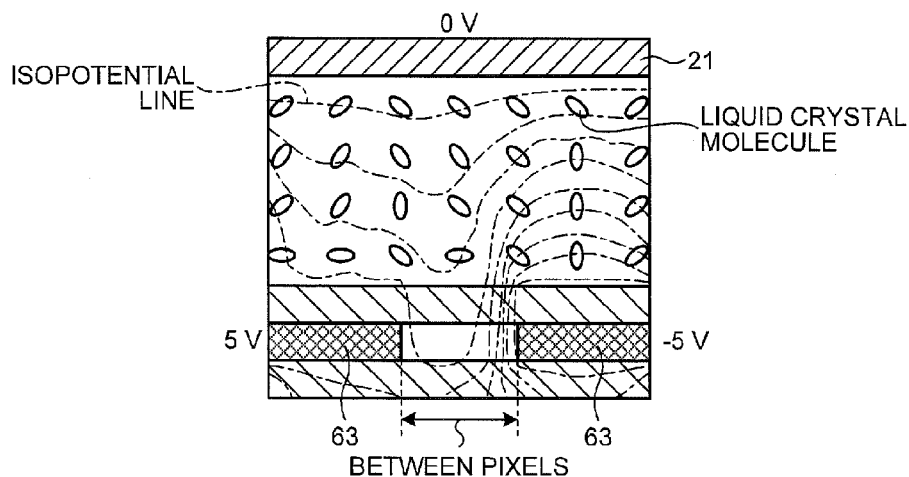
FIG. 5B is a diagram illustrating a result of simulation when a voltage is applied by a line inversion driving method or a dot inversion driving method, concerning the reason why the frame inversion driving method is desirably employed.
Figure 5C:
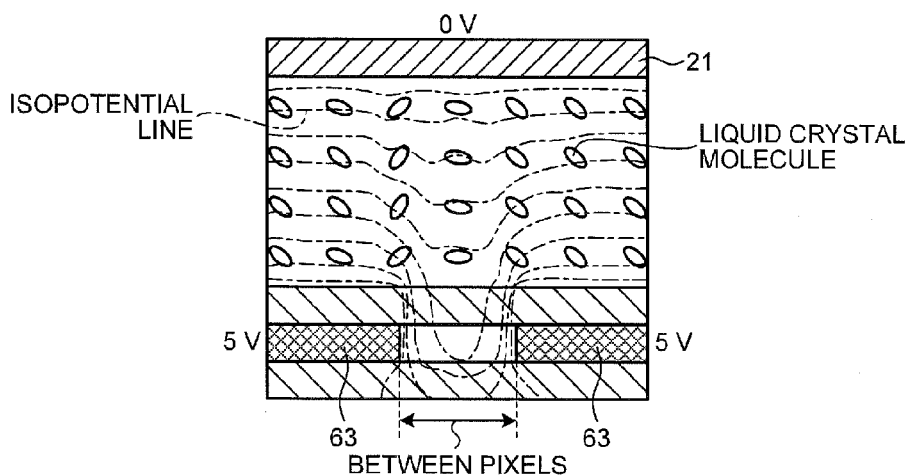
FIG. 5c is a diagram illustrating a result of simulation when a voltage is applied by the frame inversion driving method, concerning the reason why the frame inversion driving method is desirably employed.

The reason why the frame inversion driving method is preferably employed will be described by using simulation results of FIGS. 5A to 5C. FIG. 5A illustrates a simulation result when no voltage is applied to the pixels 50. FIG. 5B illustrates a simulation result when a voltage is applied to the pixels 50 by the line inversion or dot inversion driving method. FIG. 5C illustrates a simulation result when a voltage is applied to the pixels 50 by the frame inversion driving method. In FIGS. 5B and 5C, isopotential lines are illustrated in dashed-dotted lines.

In the case of the line inversion or dot inversion driving method, the potential between the transparent electrode (counter electrode) 21 and a reflective electrode (pixel electrode) 63 varies between two adjacent pixels. The behavior of liquid crystal molecules near one of the pixels is different from the other. The liquid crystal molecular orientation between the pixels is thus unstable. This is also clear from the distribution of isopotential lines illustrated in dashed-dotted lines in FIG. 5B.

By the line inversion or dot inversion driving method where adjacent two pixels have different potentials, the liquid crystal molecular orientation between the pixels cannot be stably controlled. If transmissive display is performed by using spaces where the liquid crystal molecular orientation is unstable as transmissive display areas, an afterimage and the like can occur.

In the case of the frame inversion driving method, the potentials between the transparent electrode 21 and the reflective electrodes 63 of two adjacent pixels are the same. The behavior of liquid crystal molecules near one of the pixels is similar to that of liquid crystal molecules near the other. When the frame inversion driving method is used, the liquid crystal molecular orientation between the pixels is more stable than with the line inversion or dot inversion driving method. This is also clear from the distribution of isopotential lines illustrated in dashed-dotted lines in FIG. 5C.

By the frame inversion driving method where adjacent two pixels have the same potential, the liquid crystal molecular orientation between the pixels can be controlled in a relatively stable manner. Even if transmissive display is performed by using the spaces between the pixels (the spaces between the reflective electrodes of the adjacent pixels) as transmissive display areas, an afterimage can be effectively suppressed. From such a reason, when performing transmissive display by using the spaces between the reflective electrodes 63, the frame inversion driving method is more preferably used than the line inversion and dot inversion driving methods. It should be noted that the use of the line inversion and dot inversion methods, as mentioned previously, is not excluded.

2-2. MIP Technology

If the frame inversion driving method is used, signal voltages having the same polarity are written to the signal lines over a frame period. This may cause shading. When using the frame inversion driving method, the transflective liquid crystal display device 1 then employs memory in pixel (MIP) technology in which pixels having a memory function are used as the pixels 50. For example, the pixels 50 may each include a memory capable of storing data. With the MIP technology, a constant voltage is always applied to the pixels 50, whereby shading can be reduced.

The MIP technology can achieve display in an analog display mode and display in a memory display mode since the pixels include a memory for storing data. The analog display mode refers to a display mode in which pixel gradations are displayed in an analog manner. The memory display mode refers to a display mode in which pixel gradations are digitally displayed based on binary information (logic "1"/logic "0") stored in the memories in the pixels.

In the memory display mode, since the information stored in the memories is used, an operation for writing signal potentials reflecting gradations does not need to be performed in frame periods. The power consumption in the memory display mode is thus lower than in the analog display mode where the operation for writing signal potentials reflecting gradations needs to be performed in frame periods. In other words, the power consumption of the transflective liquid crystal display device 1 can be reduced.

Figure 6:
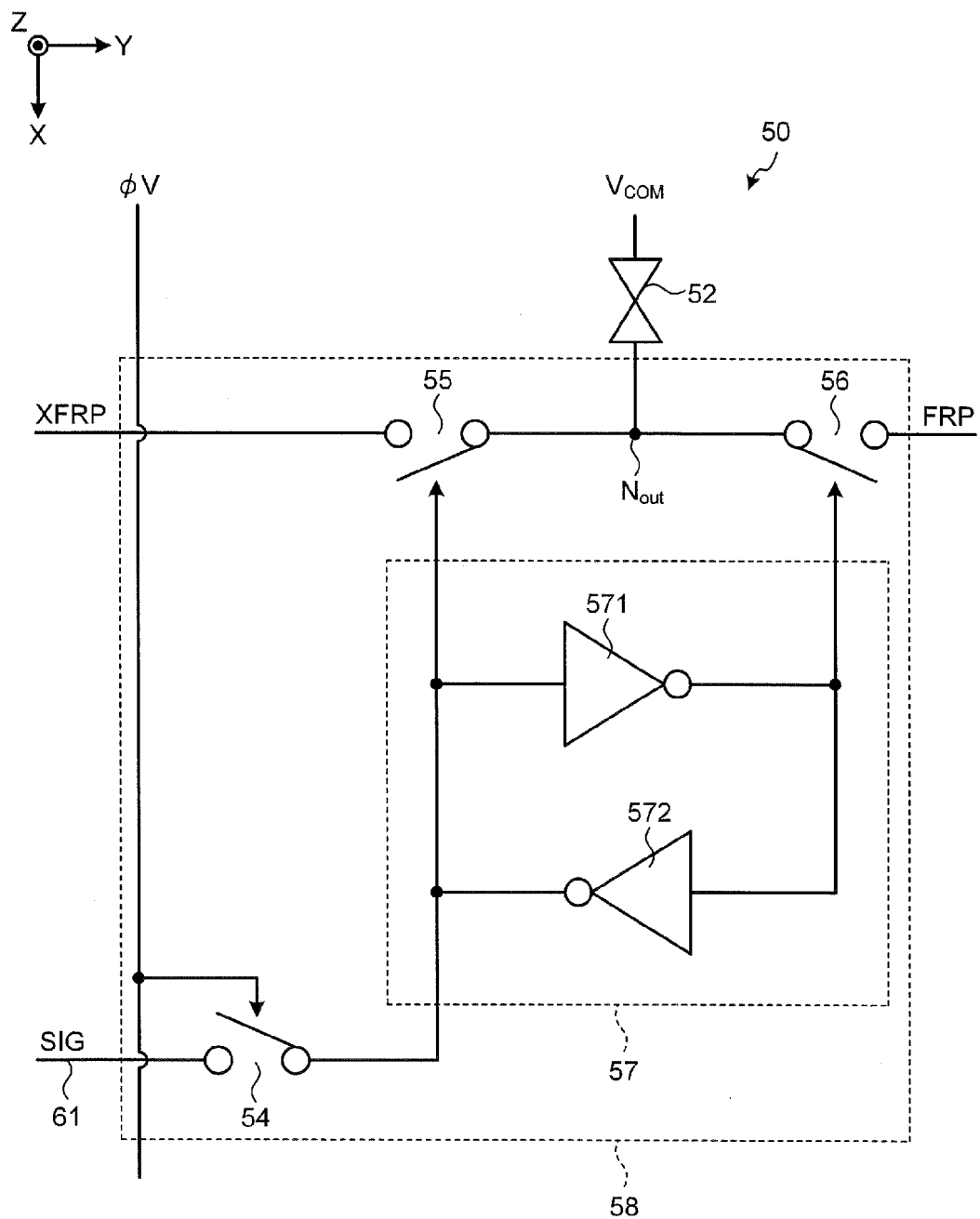
FIG. 6 is a block diagram illustrating an example of a circuit configuration of a pixel employing an MIP technology.
Figure 7:
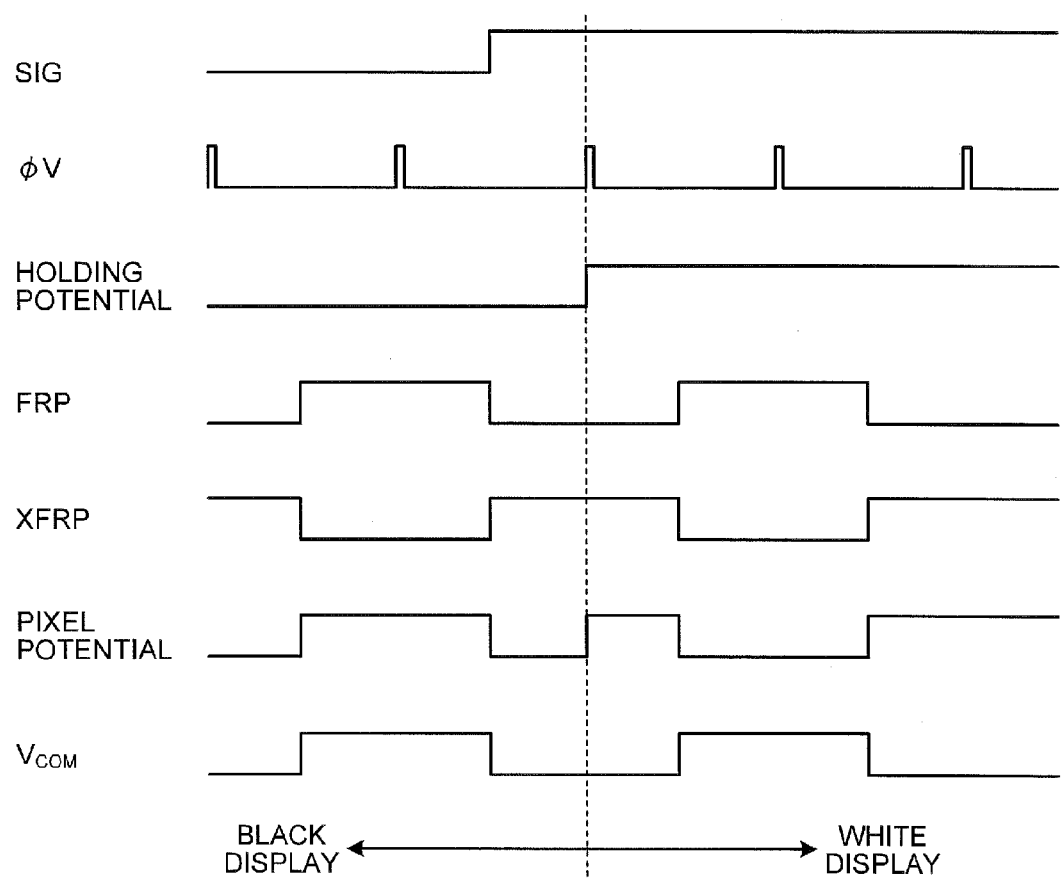
FIG. 7 is a timing chart for describing an operation of the pixel employing the MIP technology.

FIG. 6 is a block diagram illustrating an example of a circuit configuration of a pixel employing the MIP technology. In FIG. 6, parts equivalent to those of FIG. 2A are designated by the same reference numerals. FIG. 7 illustrates a timing chart for describing the operation of the pixel employing the MIP technology.

As illustrated in FIG. 6, a pixel 50 includes a liquid crystal capacitor (liquid crystal cell) 52 and a drive circuit unit 58 including three switch elements 54, 55, 56, and a latch unit 57. The drive circuit unit 58 has a static random access memory (SRAM) function. The pixel 50 including the drive circuit unit 58 has a pixel configuration with an SRAM function. The liquid crystal capacitor (liquid crystal cell) 52 refers to a liquid crystal capacitance occurring between the pixel electrode (for example, a reflective electrode 63 of FIG. 3) and the counter electrode arranged opposite thereto.

One end of the switch element 54 is coupled to a signal line 61 (corresponding to the signal lines $61_1$ to $61_3$ of FIG. 2A). When a scan signal $\phi V$ is supplied from the scan circuit 71 of FIG. 2A, the switch element 54 turns on (closed) and takes in data SIG supplied from the signal output circuit 70 of FIG. 2A via the signal line 61. The latch unit 57 includes inverters 571 and 572 which are reversely coupled to each other in parallel. The latch unit 57 holds (latches) a potential according to the data SIG taken in by the switch element 54.

A control pulse XFRP having a phase opposite to and a control pulse FRP having the same phase as that of the common potential $V_{COM}$ are applied to one terminals of the switch elements 55 and 56, respectively. The other terminals of the switch elements 55 and 56 are coupled in common. The common coupling node serves as an output node $N_{out}$ of the present pixel circuit. Either one of the switch elements 55 and 56 turns on according to the polarity of the holding potential of the latch unit 57. As a result, the control pulse FRP or the control pulse XFRP is applied to the pixel electrode (for example, a reflective electrode 63 of FIG. 3) of the liquid crystal capacitor 52 in which the common voltage $V_{COM}$ is applied to the counter electrode (the transparent electrode 21 of FIG. 1).

As is clear from FIG. 7, in the present example, when the holding potential of the latch unit 57 has the negative polarity, the pixel potential of the liquid crystal capacitor 52 has the same phase as that of the common potential $V_{COM}$. This results in black display. When the holding potential of the latch unit 57 has the positive polarity, the pixel potential of the liquid crystal capacitor 52 has the phase opposite to that of the common potential $V_{COM}$. This results in white display.

As is clear from the foregoing, in the MIP pixel 50, either one of the switch elements 55 and 56 turns on according to the polarity of the holding potential of the latch unit 57. The control pulse FRP or the control pulse XFRP is thereby applied to the pixel electrode (for example, the reflective electrode 63 of FIG. 3) of the liquid crystal capacitor 52. As a result, a constant voltage is always applied to the pixel 50, whereby the occurrence of shading is suppressed.

The present example has been described by using an SRAM as an example of the memory built in the pixel 50. However, the SRAM is just an example. The pixel 50 may be configured to use other memories such as a dynamic random access memory (DRAM).

In the present embodiment, the MIP technology may be employed with an area coverage modulation method, a time division modulation method, or the like. In the time division modulation method, the pixel potentials vary and the liquid crystal molecules move in and between the pixels move with time even in the case of a still image. The area coverage modulation method is therefore more preferably used than the time division modulation method. In the area coverage modulation method, the pixel electrodes, i.e., the reflective electrodes 63 are divided and the gaps between the electrodes increase. This provides the advantage of higher panel transmittance than when the pixel electrodes are not divided.

In the foregoing example, MIP pixels each having a memory capable of storing data are used as the pixels having a memory function. However, this is just an example. Examples of the pixels having a memory function aside from MIP pixels may include, but are not limited to, pixels using conventional memory type liquid crystals.

2-3. Display Mode

Display modes of liquid crystals include a normally white mode in which white display is provided when no electric field (voltage) is applied and black display is provided when an electric field is applied, and a normally black mode in which black display is provided when no electric field is applied and white display is provided when an electric field is applied. In both modes, the liquid crystal cell has the same structure, but the polarization plates 11 and 26 of FIG. 1 are arranged differently.

When transmissive display is performed by using the spaces between the reflective electrodes 63 (the spaces between the pixels 50), not all the liquid crystal molecules between the pixels are switched. In some areas, liquid crystal molecules do not move. In the normally white mode, the presence of the areas where liquid crystal molecules do not move precludes sharp blackening, which may result in lower contrast.

Figure 8:
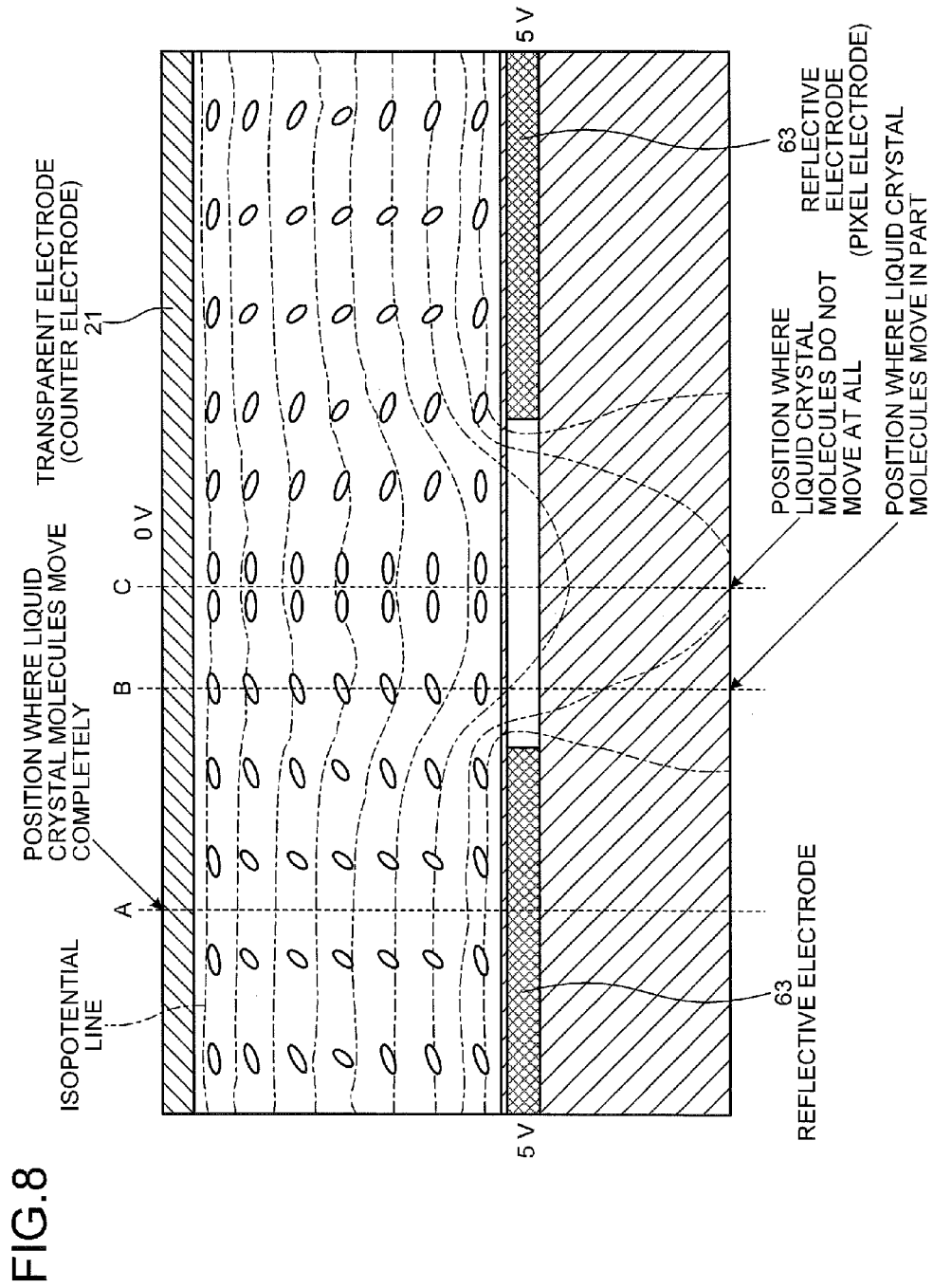
FIG. 8 is a diagram illustrating a movement of liquid crystal molecules between pixels of reflective electrodes when transmissive display is performed by using a space between reflective electrodes (a space between the pixels)

FIG. 8 illustrates the movement of liquid crystal molecules between pixels when transmissive display is performed by using the space between the reflective electrodes 63 (the spaces between the pixels 50). In FIG. 8, liquid crystal molecules move completely in a position A in the center of a reflective electrode 63. In a position B near the reflective electrodes 63 between the pixels, liquid crystal molecules move in part. In a position C at the center between the pixels, liquid crystal molecules do not move at all.

The center area between the pixels where the liquid crystal molecules do not move at all has transmittance extremely higher than that of the areas of the reflective electrodes 63, thereby causing leakage of light. This result in less sharp black and low contrast.

Figure 9:
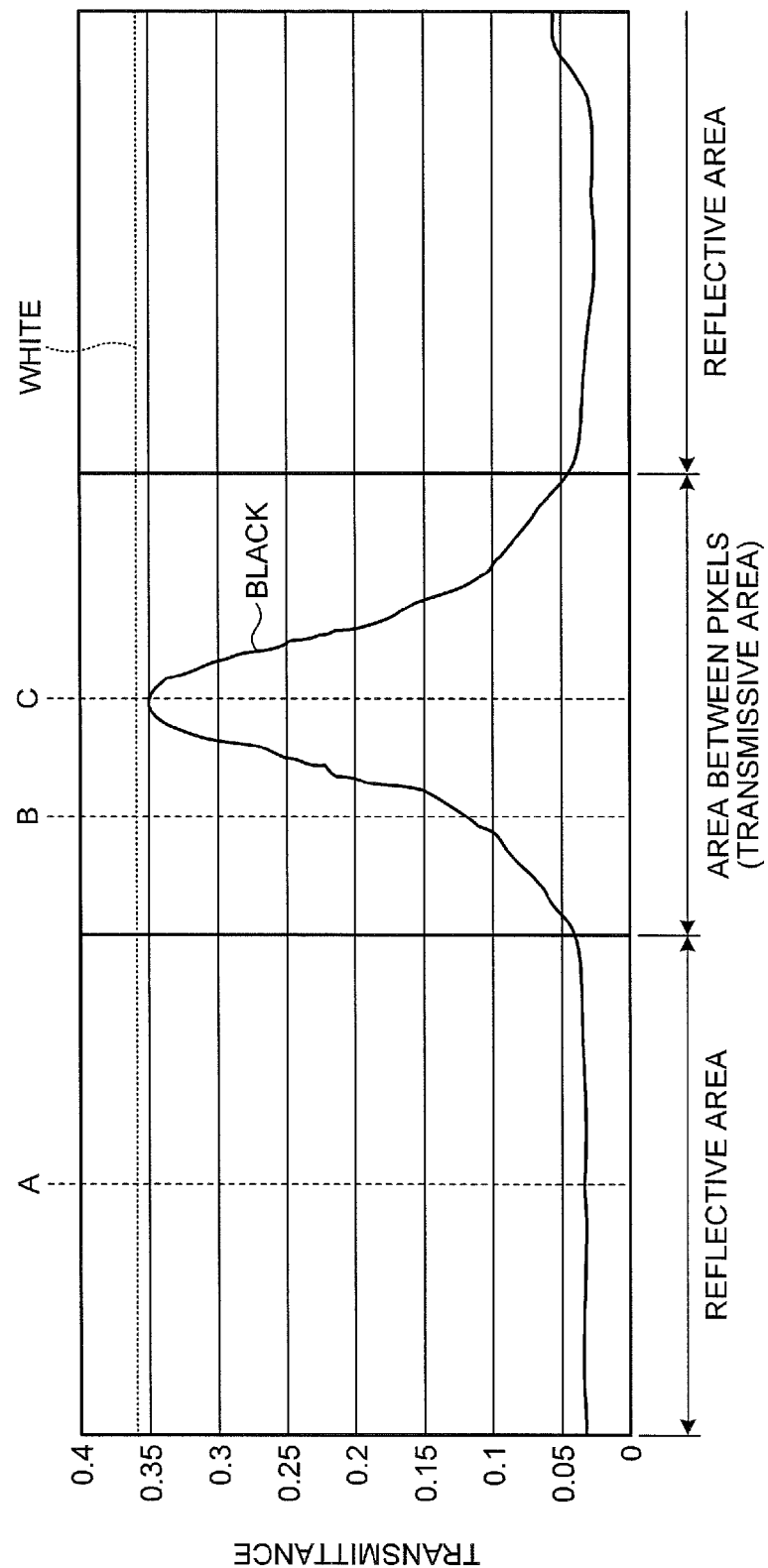
FIG. 9 is a diagram illustrating a simulation result of transmittance between pixels in a normally white mode.

FIG. 9 illustrates a simulation result of the transmittance between the pixels in the normally white mode. The positions A, B, and C in FIG. 9 correspond to the positions A, B, and C in FIG. 8, respectively. The simulation result of FIG. 9 shows that the transmittance in the position C at the center between the pixels of FIG. 8 is high (for example, approximately 0.35) because the liquid crystal molecules do not move at all.

From such a reason, the normally black mode is desirably employed as the display mode of the transflective liquid crystal display device according to the present embodiment. In the normally black mode, black display is provided when no voltage is applied to the liquid crystals, i.e., when the liquid crystal molecular orientation is uniform. This allows sharp blackening and higher contrast. It should be noted that the use of the normally white mode is not precluded.

Examples of actual measurements of optical characteristics will be given. In the normally white mode, the white transmittance (%) is approximately 0.93 and the black transmittance (%) is approximately 0.29. The contrast is approximately 3. In the normally black mode, the white transmittance (%) is approximately 0.71 and the black transmittance (%) is approximately 0.06. The contrast is approximately 12. The normally black mode can be employed to improve the contrast to approximately four times that of the normally white mode.

2-4. Overlapping of Color Filters

Figure 10:
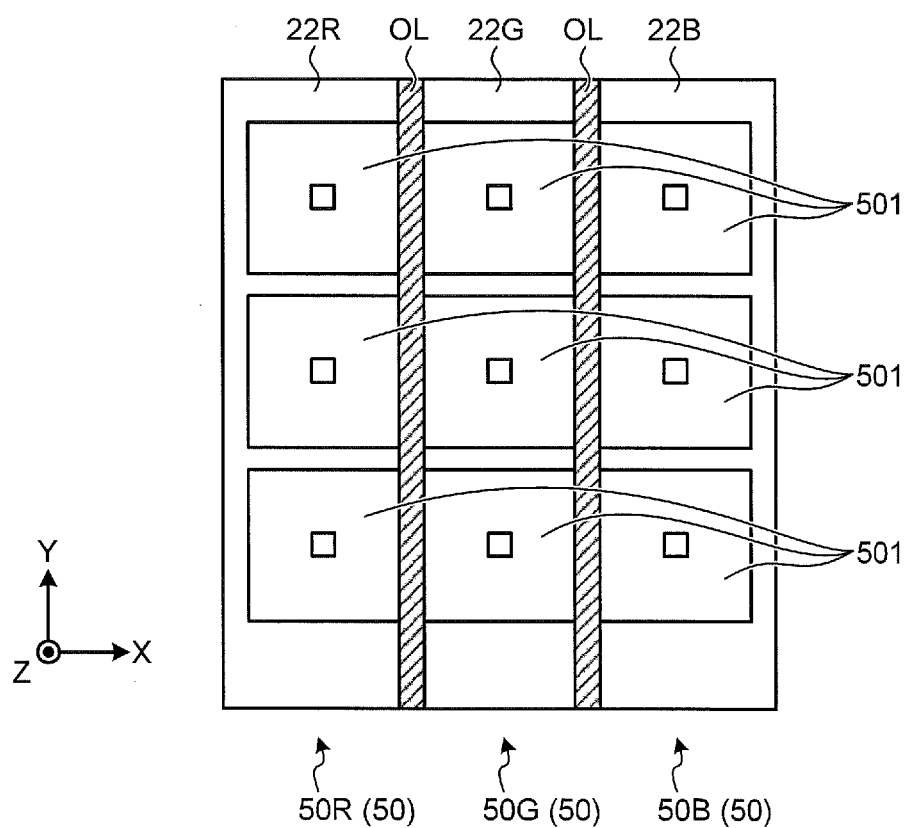
FIG. 10 is a diagram illustrating color pixels which are divided from each other by overlapping portions of color filters.

FIG. 10 illustrates a structure in which color filters 22R and 22G are overlapped each other, and color filters 22G and 22B are overlapped each other, so that the sub-pixels 50R, 50G, and 50B are light-shielded and divided by the overlapping portions OL. The overlapping portions OL have a light transmittance higher than that of a black matrix, and lower than when the color filters 22R, 22G, 22B are not overlapped. When transmissive display is performed by using the transflective liquid crystal display device 1 illustrated in FIG. 1, the spaces $65_B$, which lie not in the overlapping portions OL but between the sub sub-pixels (divided sub-pixels) 501 adjacent in the Y direction and extending in the X direction, are thus used. To improve display quality when performing transmissive display by using the transflective liquid crystal display device 1, it is therefore desirable to improve the light use efficiency in the spaces $65_B$.

2-5. Orientation of Liquid Crystal Molecules

Figure 11A:
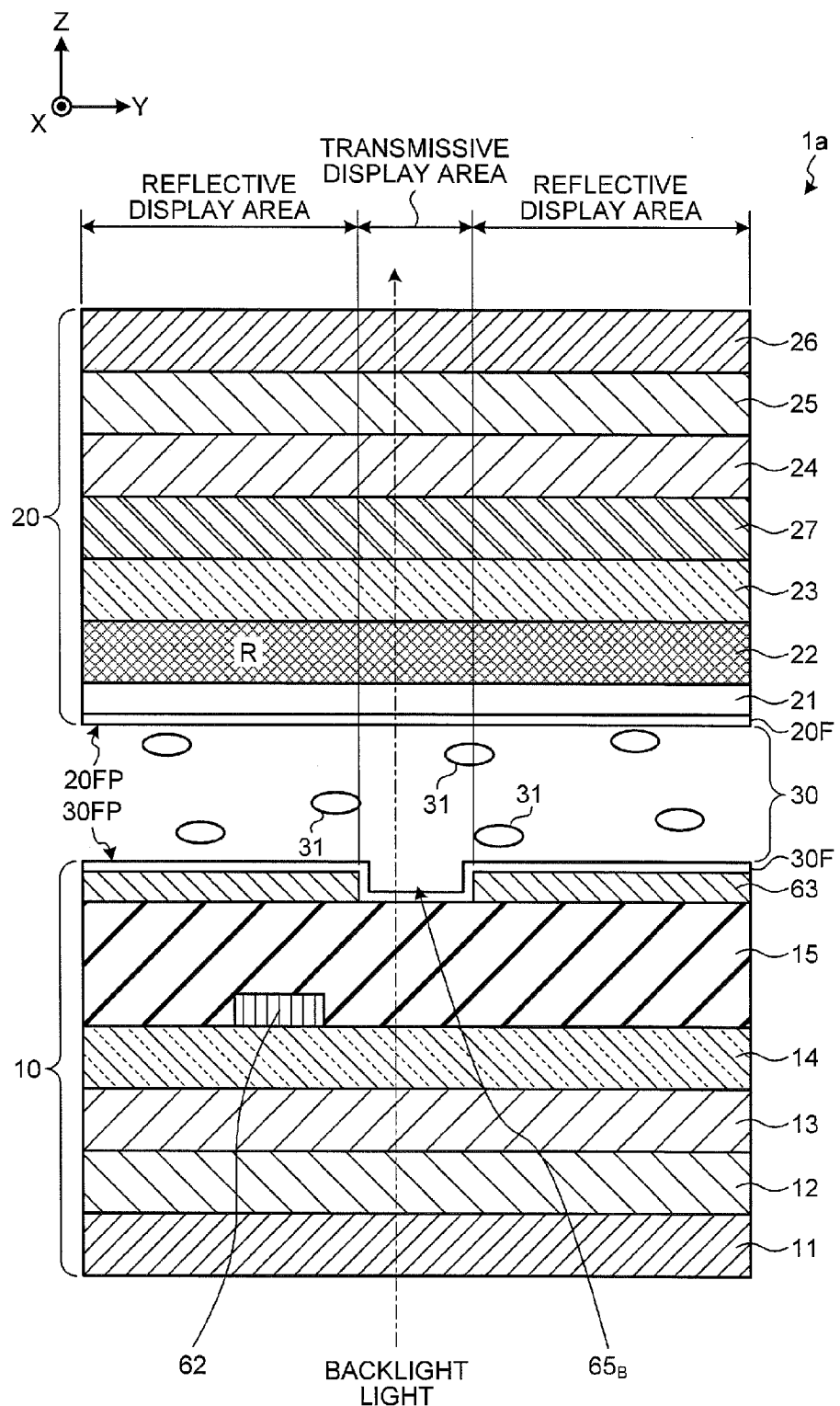
FIG. 11A is a sectional view illustrating the transflective liquid crystal display device to which the present disclosure is applied.
Figure 11B:
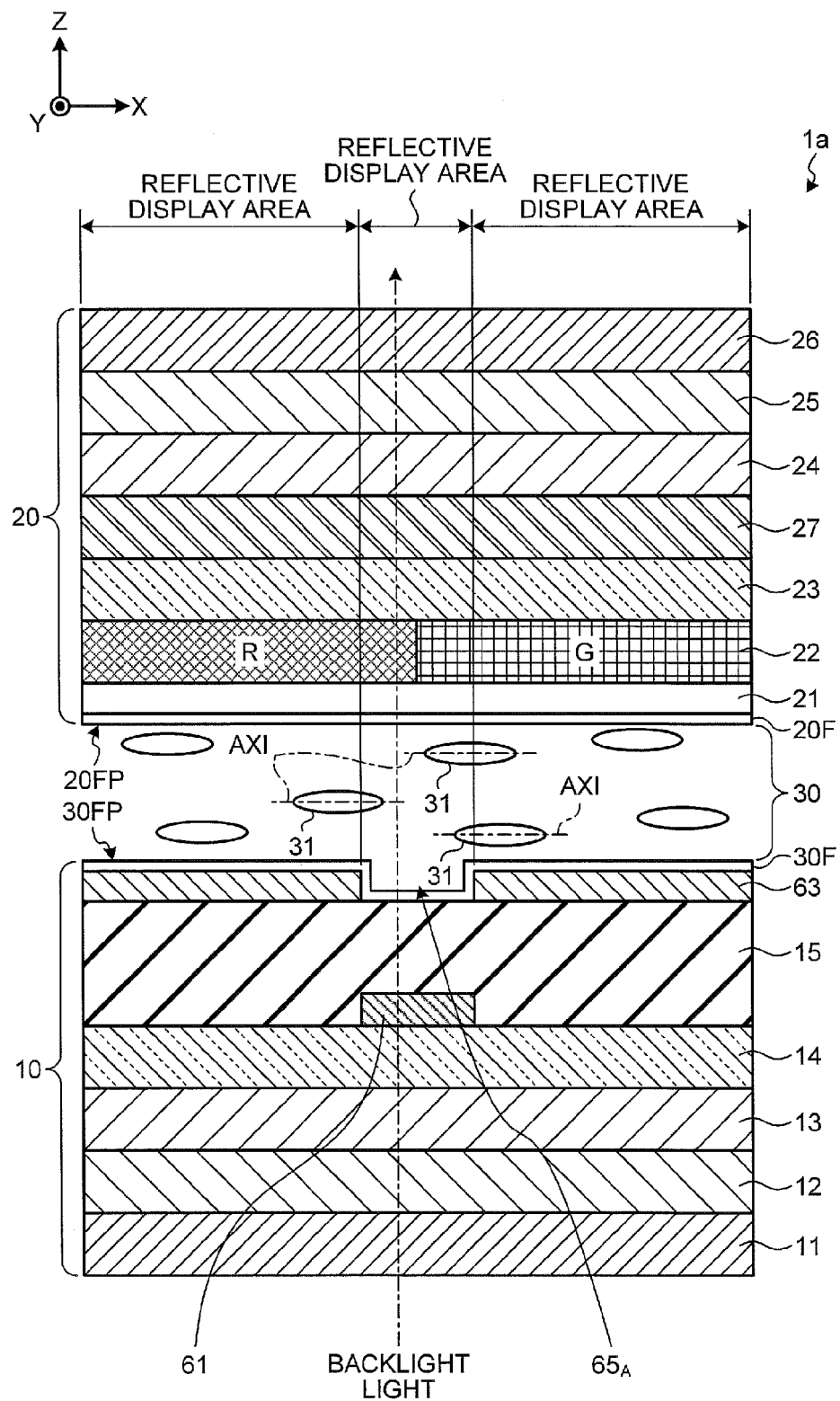
FIG. 11B is a sectional view illustrating the transflective liquid crystal display device to which the present disclosure is applied.

To improve the transmittance of the spaces $65_B$ between the sub-pixels 50 or the sub sub-pixels 501 illustrated in FIG. 10, liquid crystal molecules 31 included in a transflective liquid crystal display device 1a illustrated in FIGS. 11A and 11B desirably have a twisted nematic (TN) orientation. FIG. 11A illustrates a sectional structure of two pixels adjacent in a direction orthogonal to the extending direction of scan lines 62 of the transflective liquid crystal display device 1a, i.e., in the column direction. FIG. 11B illustrates a sectional structure of two pixels adjacent in a direction orthogonal to the extending direction of signal lines 61 of the transflective liquid crystal display device 1a, i.e., in the row direction. The twisted nematic orientation refers to an orientation state in which, in FIGS. 11A and 11B, a group of liquid crystal molecules 31 in a liquid crystal layer 30 sandwiched between a first substrate 14 serving as a TFT substrate and a second substrate 23 serving as a CF substrate have a long axis direction AX1 that is parallel to the surfaces 30FP and 20FP of an orientation film 30F on the side of the first substrate 14 and an orientation film 20F on the side of the second substrate 23 and is twisted between the first substrate 14 and the second substrate 23. The transflective liquid crystal display device 1a illustrated in FIGS. 11A and 11B is obtained by adding a scattering layer 27 to the transflective liquid crystal display device 1 illustrated in FIG. 1. In the present embodiment, like the transflective liquid crystal display device 1a, the scattering layer 27 may be included. Like the transflective liquid crystal display device 1, the scattering layer 27 does not need to be included. The scattering layer 27 will be described later.

Figure 12:
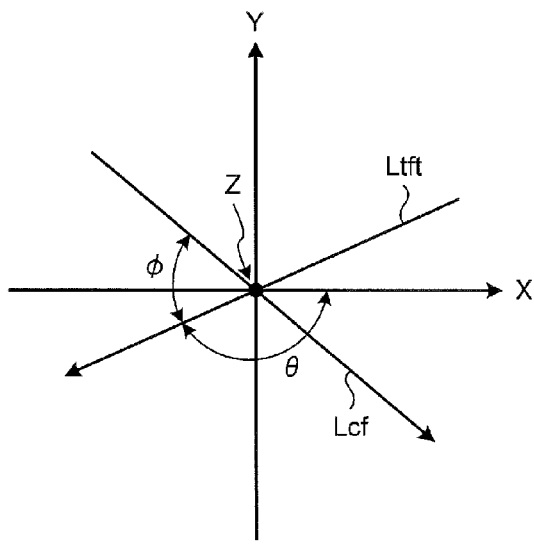
FIG. 12 is an explanatory diagram illustrating rubbing directions.

In the present embodiment, as illustrated in FIG. 12, a direction of rubbing (hereinafter, referred to as a rubbing direction, if needed) is expressed by an angle with respect to the X direction in the XY plane, i.e., the row direction of the plurality of pixels (sub-pixels) 50 arranged in a matrix. The Y direction is the column direction of the plurality of pixels (sub-pixels) 50 arranged in a matrix. In FIG. 12, a line Ltft represents the rubbing direction on the side of the first substrate 14. A line Lcf represents the rubbing direction on the side of the second substrate 23. Hereinafter, the lines Ltft and Lcf may be referred to as rubbing axes. Liquid crystal molecules 31 in contact with the first substrate 14 and the second substrate 23, or more specifically, in contact with the orientation films arranged on the respective surfaces of the first substrate 14 and the second substrate 23 are arranged so that their long axes AX1 are parallel to the rubbing axes Ltft and Lcf corresponding to the respective orientation films.

The angle formed between the rubbing axis Ltft and the X direction, and the angle formed between the rubbing axis Lcf and the X direction are each referred to as a rubbing angle. In the present embodiment, the rubbing angle on the side of the first substrate 14 is expressed by $\theta$. The angle $\phi$ formed between the rubbing axis Ltft on the side of the first substrate 14 and the rubbing axis Lcf on the side of the second substrate 23 is referred to as a twist angle. In the present embodiment, the rotation of the rubbing angle $\theta$ and the twist angle $\phi$ from the X-axis toward the first quadrant (counterclockwise) about the Z-axis will be referred to as being in a positive direction. The rotation from the X-axis toward the fourth quadrant (clockwise) will be referred to as being in a negative direction.

Figure 13:
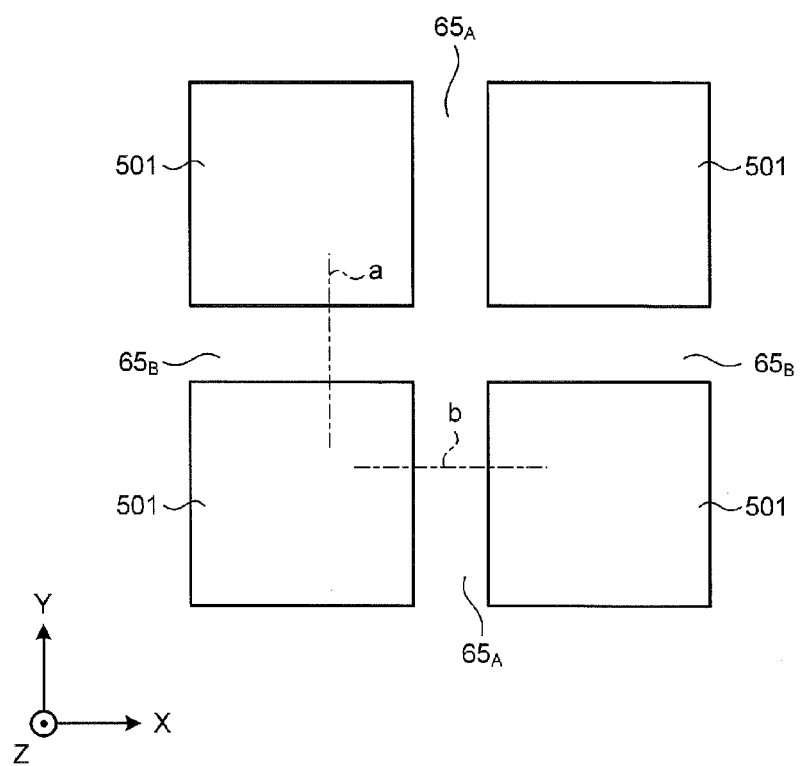
FIG. 13 is a plan view illustrating a plurality of divided pixel electrodes and spaces between pixels.

If the twist angle $\phi$ is 0 degrees or ±180 degrees, the orientation of the liquid crystal molecules 31 is a homogeneous orientation. In the present embodiment, when the liquid crystal molecules 31 are in the homogeneous orientation, the transmittance of a space $65_B$ extending in the X direction in a position indicated by the dashed-dotted line a in FIG. 13, i.e., between sub sub-pixels 501 adjacent in the Y direction is approximately 0.4. The transmittance increases sharply as the twist angle $\phi$ exceeds 0 degrees or 180 degrees. The transmittance increases up to approximately 1.1 at about ±10 degrees (or ±170 degrees). The transmittance then decreases gradually as the twist angle $\phi$ increases. At twist angles $\phi$ of ±90 degrees, the transmittance has a value approximately twice that in the homogeneous orientation. When the liquid crystal molecules 31 are in the homogeneous orientation, the transmittance of a space $65_A$ extending in the Y direction in a position indicated by the dashed-dotted line b in FIG. 13, i.e., between sub sub-pixels 501 adjacent in the X direction is approximately 0.2. The transmittance increases sharply as the twist angle $\phi$ exceeds 0 degrees or 180 degrees. The transmittance increases up to approximately 0.8 at about ±40 degrees (or ±140 degrees). The transmittance then degreases gradually as the twist angle $\phi$ increases. At twist angles $\phi$ of ±90 degrees, the transmittance has a value approximately twice that in the homogenous orientation.

When the twist angle $\phi$ has a value other than 0 degrees or ±180 degrees, i.e., the orientation of the liquid crystal molecules 31 is other than the homogeneous orientation, the liquid crystal molecules 31 are twisted between the first substrate 14 and the second substrate 23. The transmittances of the spaces $65_A$ and $65_B$ between the sub sub-pixels 501 increase significantly as compared to in the homogeneous orientation. As a result, transmissive display can be achieved while maintaining reflective display performance equivalent to that of a reflective display device. Next, the rubbing angle $\theta$ on the side of the first substrate 14 will be described.

The intensity of an electric field formed in an XY plane by a voltage applied between the reflective electrodes 63 and the transparent electrode 21 illustrated in FIGS. 11A and 11B is higher on the side of the first substrate 14 than on the side of the second substrate 23. The reason is that the transparent electrode 21 on the side of the second substrate 23 is continuous in the XY plane, and there is no potential difference within the XY plane. The reflective electrodes 63 on the side of the first substrate 14 have a potential difference between adjacent reflective electrodes 63, and there is a potential difference within the XY plane. When the transflective liquid crystal display devices 1 and 1a perform transmissive display, the orientation direction of the liquid crystal molecules 31 on the side of the first substrate 14 is therefore more important. The orientation direction of the liquid crystal molecules 31 on the side of the first substrate 14 is determined by the rubbing direction on the side of the first substrate 14.

The liquid crystal molecules 31 lying on the front sides of the reflective electrodes 63 make a switching operation in the Z-axis direction to achieve reflective display of the transflective liquid crystal display devices 1 and 1a. The liquid crystal molecules 31 lying between the sub sub-pixels 501, between the sub-pixels 50, or the like make a switching operation within the XY plane to achieve transmissive display of the transflective liquid crystal display devices 1 and 1a. For transmissive display, consideration is desirably given to the switching operation of the liquid crystal molecules 31 lying between the sub sub-pixels 501, between the sub-pixels 50, or the like.

Figure 14:
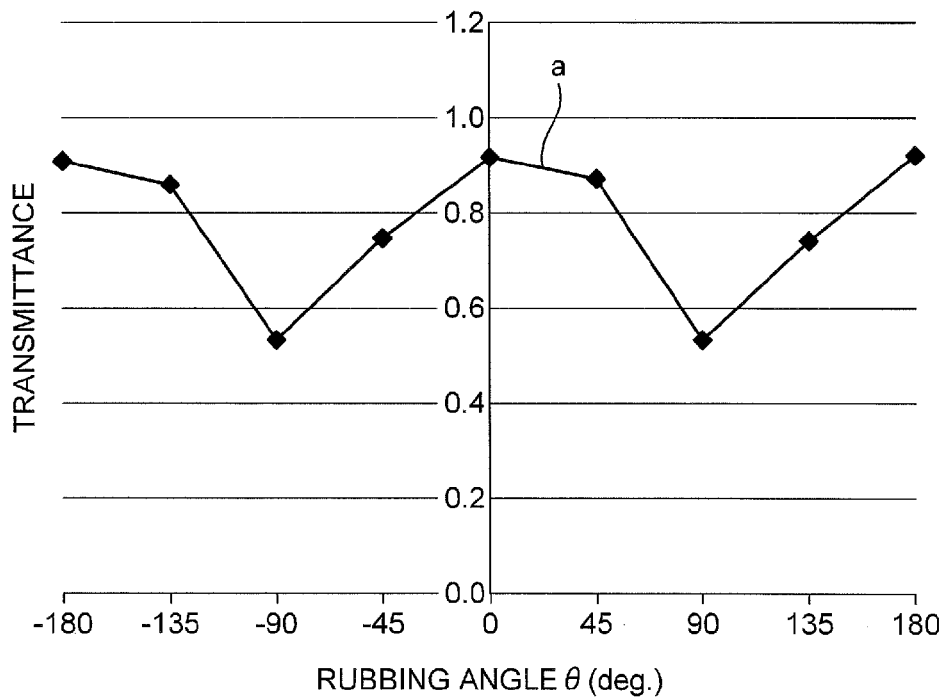
FIG. 14 is a diagram illustrating a relationship between a rubbing direction and transmittance.

FIG. 14 illustrates a result of simulation of the transmittance when the twist angle $\phi$ is set to 70 degrees and the rubbing angle $\theta$ is changed. The solid line a of FIG. 14 indicates the relationship between the transmittance and the rubbing angle $\theta$ in the position indicated by the dashed-dotted line a in FIG. 13. As can be seen from the result of FIG. 14, the rubbing angle $\theta$ defining the rubbing direction on the side of the first substrate 14 desirably falls within the range of −45 degrees to 0 degrees, 0 degrees to 45 degrees, −135 degrees to −180 degrees, or 135 degrees to 180 degrees. In such a range, the light transmittance of the spaces $65_B$ formed between the sub sub-pixels 501 adjacent in the Y direction can be increased. This can effectively improve the light use efficiency in the spaces $65_B$, whereby the display quality when performing transmissive display by using the transflective liquid crystal display devices 1a and 1 can be improved.

Figure 15:
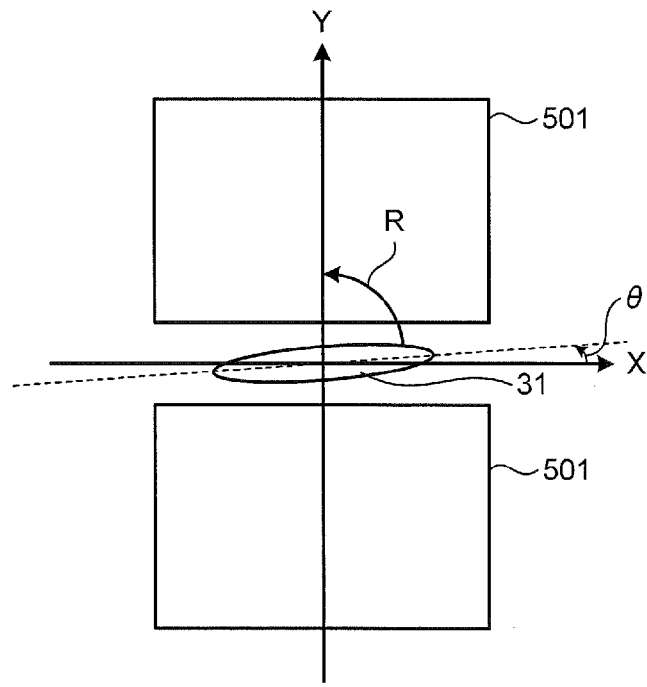
FIG. 15 is a schematic diagram illustrating a rubbing direction and the state of a liquid crystal molecule on a side of a TFT substrate serving as a first substrate before application of a voltage.
Figure 16:
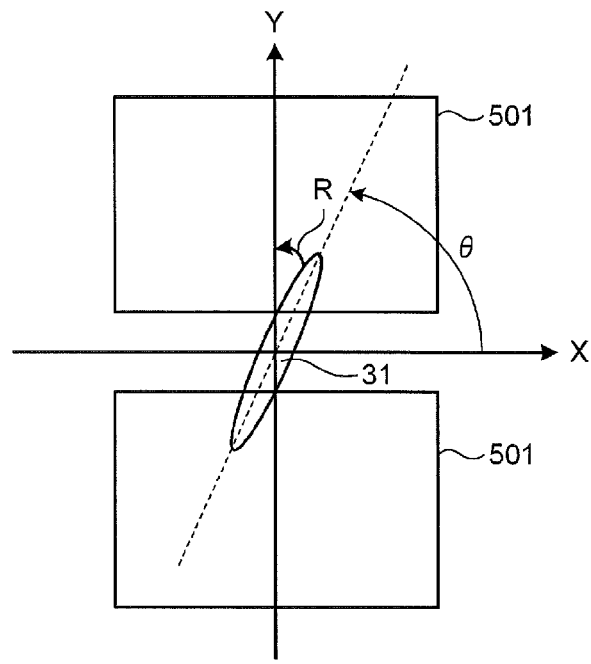
FIG. 16 is a schematic diagram illustrating a rubbing direction and the state of a liquid crystal molecule on the side of the TFT substrate serving as the first substrate before application of a voltage.
Figure 17:
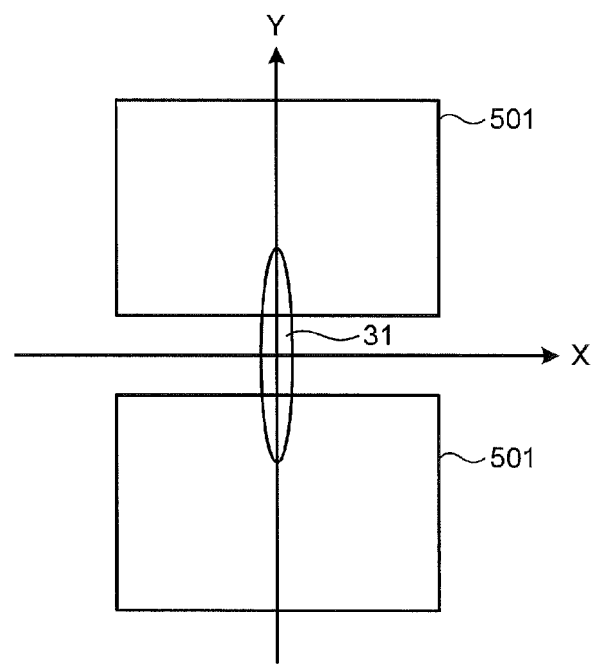
FIG. 17 is a schematic diagram illustrating the state of a liquid crystal molecule when a voltage is applied.

If the rubbing angle θ is relatively small, as illustrated in FIGS. 15 and 17, the rotation of a liquid crystal molecule 31 within the XY plane before and after the application of a voltage is large (arrow R in FIG. 15). This results in high transmittance. If the rubbing angle θ is relatively large, as illustrated in FIGS. 16 and 17, the rotation of a liquid crystal molecule 31 within the XY plane before and after the application of a voltage is small (arrow R in FIG. 16). This results in low transmittance. Setting the rubbing angle θ on the side of the first substrate 14 to the foregoing range can increase the rotation of the liquid crystal molecule 31 within the XY plane to increase the transmittance.

As described above, the overlapping portions OL lie in the spaces $65_A$ between the sub sub-pixels 501 adjacent in the X direction. To improve the transmittance of the entire transflective liquid crystal display devices 1a and 1, the transmittance of the spaces $65_B$ formed between the sub sub-pixels 501 adjacent in the Y direction is more preferably improved than the transmittance of the spaces $65_A$. In the present embodiment, the rubbing angle θ is set to the foregoing range to improve the transmittance of the spaces $65_B$. This can efficiently improve the transmittance of the entire transflective liquid crystal display devices 1a and 1. As a result, transmissive display can be achieved while maintaining reflective display performance equivalent to that of a reflective display device.

2-6. Scattering Layer

The transflective liquid crystal display device 1a illustrated in FIGS. 11A and 11B includes the scattering layer 27 which scatters light. The scattering layer 27 is provided on a forward side of the liquid crystal layer 30 in the traveling direction of light reflected by the reflective electrodes 63. More specifically, the transflective liquid crystal display device 1a includes the scattering layer 27 between the second substrate 23 and the quarter-wave plate 24. The scattering layer 27 is an anisotropic or isotropic layer for scattering the light reflected by the reflective electrodes 63 and scattering backlight light transmitted through the spaces $65_A$ between the pixels. Examples of the scattering layer 27 include, but are not limited to, a light control film (LCF) etc.

The scattering layer 27 is a forward scattering layer which scatters light more forward and less backward. The scattering layer 27 is an anisotropic scattering layer which scatters light incident from a specific direction. The scattering layer 27 is configured to transmit incident light almost without scattering when the light is incident from a specific direction on the side of the polarization plate 26 with respect to the second substrate 23. The scattering layer 27 is configured to widely scatter light reflected and returned from the reflective electrodes 63.

Figure 18:
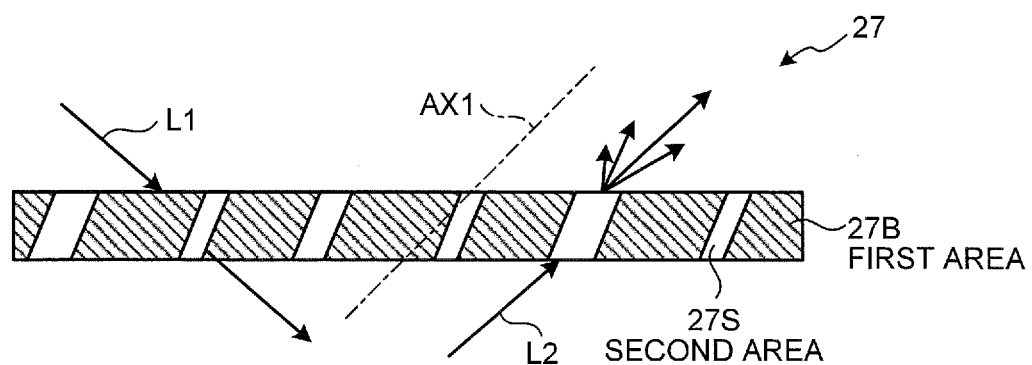
FIG. 18 is a sectional view of a scattering layer.
Figure 19:
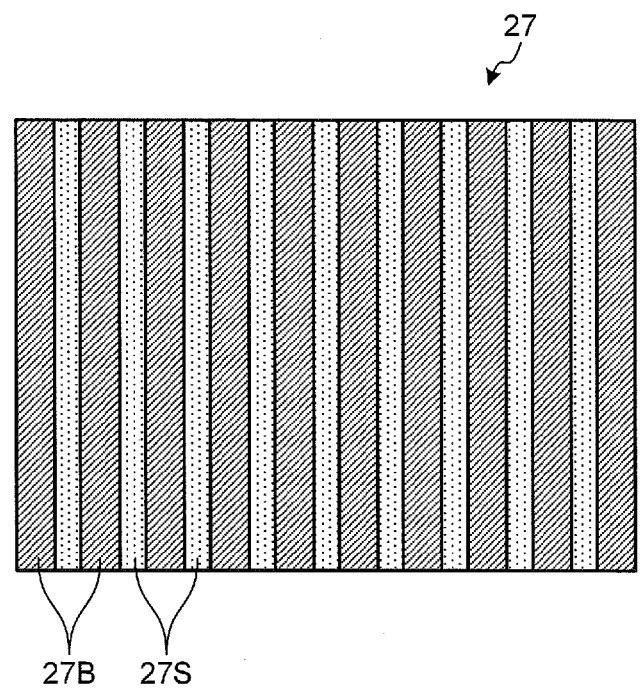
FIG. 19 is a plan view illustrating an example of the scattering layer.
Figure 20:
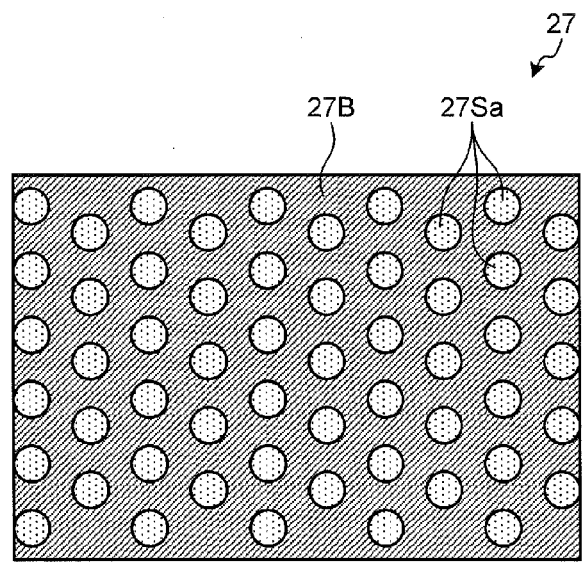
FIG. 20 is a plan view illustrating an example of the scattering layer.

For example, as illustrated in FIG. 18, when external light L1 is incident from a predetermined direction with respect to the second substrate 23, the scattering layer 27 transmits the external light L1. The scattering layer 27 scatters light L2 that is transmitted through the scattering layer 27 and reflected by the reflective electrodes 63, within a predetermined range around a scattering center axis AX1. The external light L1 is parallel light incident on the polarization plate 26 of the second substrate 23. The external light L1 may be non-polarized light or polarized light. For example, as illustrated in FIG. 18, the scattering layer 27 includes two types of areas (first area 27B and second area 27S) having respective different refractive indexes. As illustrated in FIG. 19, the scattering layer 27 may have a louver structure in which a plurality of plate-like second areas 27S are arranged among first areas 27B at predetermined intervals. As illustrated in FIG. 20, the scattering layer 27 may have a columnar structure in which columnar second areas 27Sa are arranged in a first area 27B.

For example, the scattering layer 27 includes first areas 27B and second areas 27S which extend in a thickness direction and are inclined in a predetermined direction. For example, the scattering layer 27 is formed by irradiating a resin sheet with ultraviolet rays from an oblique direction, the resin sheet being a mixture of two or more types of photopolymerizable monomers or oligomers having respective different refractive indexes. The scattering layer 27 may have a different structure from the foregoing, and may be manufactured by a different method from the foregoing. The scattering layer 27 may be a single layer or a plurality of layers. If the scattering layer 27 includes a plurality of layers, the layers may have the same structure or different structures.

For example, the scattering center axis AX1 of the scattering layer 27 is desirably directed in a main viewing angle direction. The scattering center axis AX1 may be directed in a direction different from the main viewing angle direction. In either case, the direction of the scattering center axis AX1 may be set so that when the scattering layer 27 is used, the luminance in the main viewing angle direction becomes the highest, i.e., the reflectance becomes the highest because of the effect of the scattering layer 27. The main viewing angle corresponds to a direction in which the user of the transflective liquid crystal display device 1a views a video display surface when using the transflective liquid crystal display device 1a. If the video display surface is rectangular, the main viewing angle corresponds to a direction orthogonal to the side of the video display surface closest to the user.

When the spaces $65_A$ between the pixels transmit the backlight light and the like, the transmission of the backlight light and the like can vary greatly, depending on the patterning accuracy of the reflective electrodes 63, misalignment to the second substrate 23, etc. In particular, if the reflective electrodes 63 used are made of silver by using a wet process, the variations can be extremely large. The scattering of the transmitted light by the scattering layer 27 has the advantage of smoothening the variations.

2-7. Positions of Transmissive Areas

Figure 21:
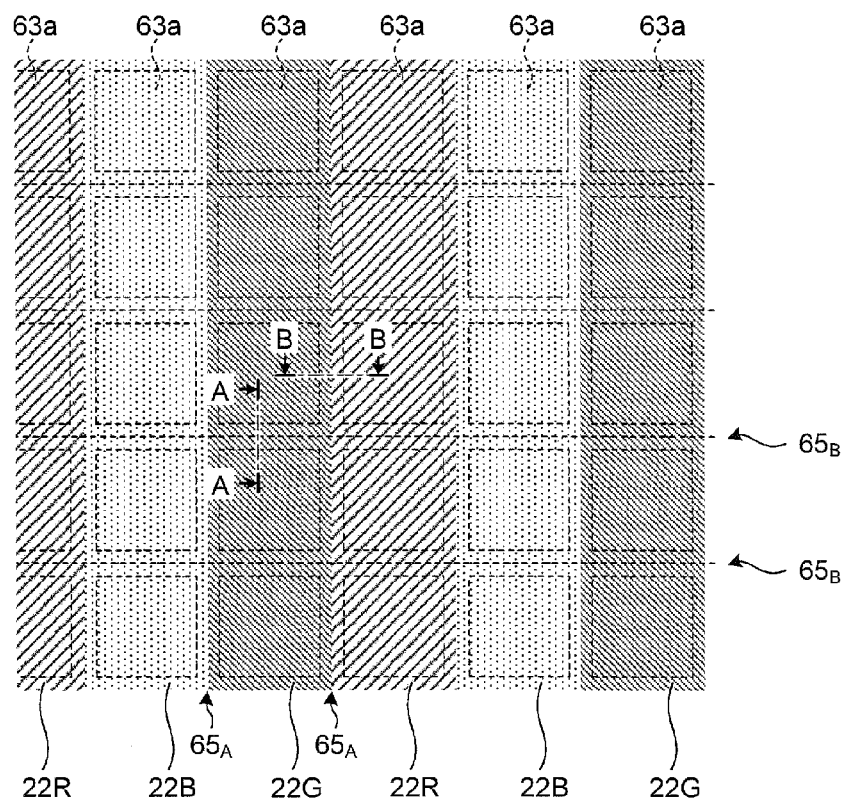
FIG. 21 is a plan view illustrating a relationship between reflective electrodes and color filters.
Figure 22:
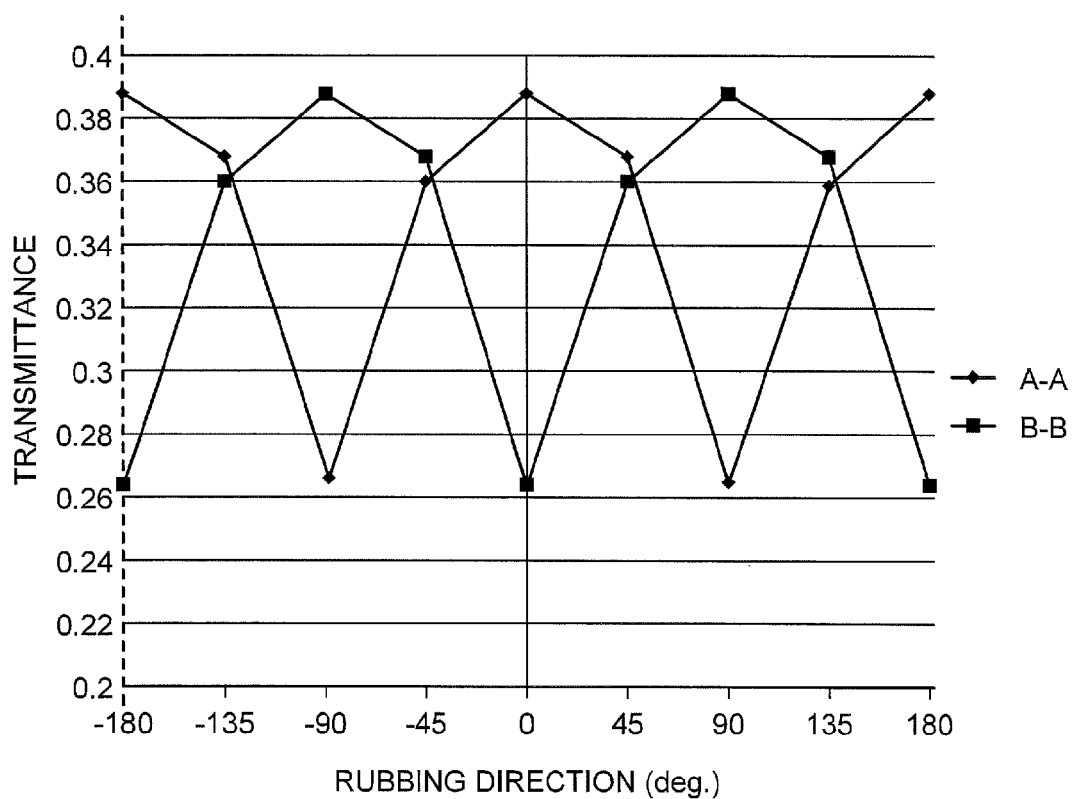
FIG. 22 is a graph illustrating a relationship between a rubbing direction and transmittance.
Figure 23A:
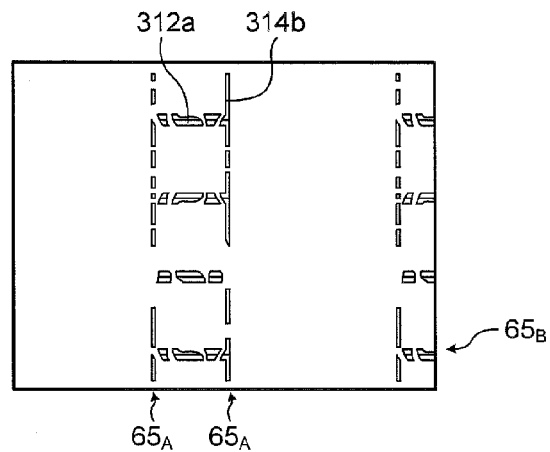
FIG. 23A is a schematic diagram illustrating an example of transmission of light in transmissive display when no light shielding member is provided.
Figure 23B:
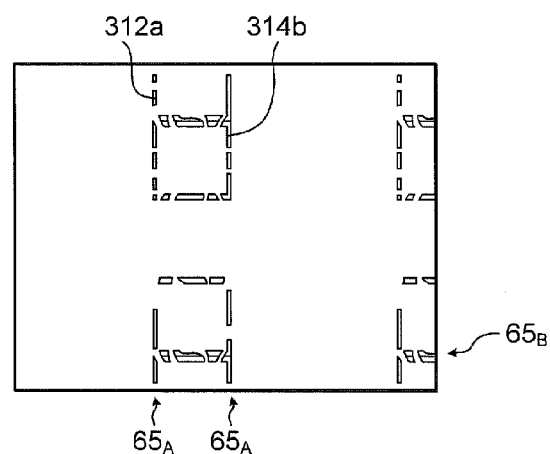
FIG. 23B is a schematic diagram illustrating an example of transmission of light in transmissive display when no light shielding member is provided.
Figure 23C:
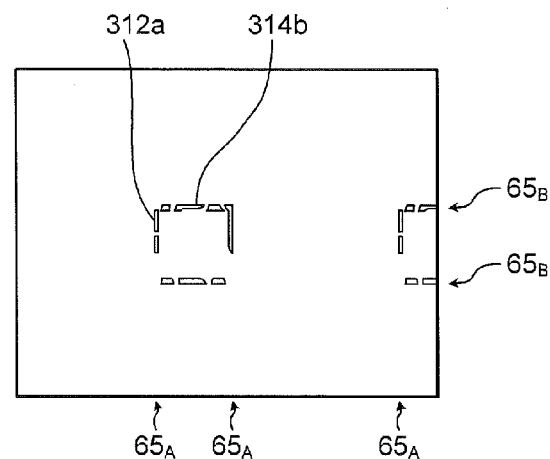
FIG. 23C is a schematic diagram illustrating an example of transmission of light in transmissive display when no light shielding member is provided.

Next, the transmissive display areas will be described. FIG. 21 is a plan view illustrating a relationship between the reflective electrodes and the color filter. FIG. 22 is a graph illustrating a relationship between the rubbing direction and the transmittance. FIGS. 23A to 23C are schematic diagrams illustrating examples of light transmission by transmissive display when no light shielding member is provided.

As illustrated in FIGS. 4A, 4B, 11A, and 11B, the transflective liquid crystal display devices 1 and 1a according to the present embodiment include, as the spaces between the reflective electrodes 63, the spaces $65_A$ extending in the direction of arrangement of the pixels in the pixel columns, i.e., in the column direction (Y direction) and the spaces $65_B$ extending in the direction of arrangement of the pixels in the pixel rows, i.e., in the row direction (X direction). In the transflective liquid crystal display device 1, the spaces $65_A$ are blocked by the signal lines 61 or the light shielding members 80, and the spaces $65_B$ are not blocked. In the transflective liquid crystal display device 1, the spaces $65_B$ serve as transmissive display areas, and the spaces $65_A$ do not serve as transmissive display areas. In the present embodiment, the spaces $65_A$ serve as reflective display areas.

As illustrated in FIG. 21, the spaces $65_A$ overlap the borders between the filters of different colors of the color filter between reflective electrodes 63a. In the spaces $65_B$, the filters of the same colors overlap. FIG. 22 illustrates the relationship between the rubbing angle θ of the liquid crystal, and the transmittance of the spaces $65_A$ (the transmittance of light emerging from the center portion of the line B-B) and the transmittance of the spaces $65_B$ (the transmittance of light emerging from the center portion of the line A-A). As illustrated in FIG. 22, the transmittance of the spaces $65_A$ and the transmittance of the spaces $65_B$ change with the position of the rubbing angle, with a phase difference of 180 degrees therebetween. As the rubbing angle changes, the transmittance of the spaces $65_A$ increases when the transmittance of the spaces $65_B$ decreases. The transmittance of the spaces $65_A$ decreases when the transmittance of the spaces $65_B$ increases. As described above, the liquid crystal of the transflective liquid crystal display device 1 is oriented with a rubbing angle such that the transmittance of the spaces $65_A$ is low and the transmittance of the spaces $65_B$ is high. Specifically, the rubbing angle of the transflective liquid crystal display device 1 is desirably set to any one of −180 degrees, 0 degrees, and 180 degrees.

The transflective liquid crystal display device 1 is configured so that the transmittance of the spaces $65_A$ overlapping the borders between the filters of different colors of the color filter between the reflective electrodes 63a is lower than that of the spaces $65_B$. In other words, the transflective liquid crystal display device 1 is configured so that the transmittance of the spaces $65_B$ overlapping the filters of the same colors of the color filter is higher than that of the spaces $65_A$. This can stabilize the optical characteristics of the light output from the borders between the pixels.

As described above, the arrangement of the color filter and the rubbing angle and the twist angles of the liquid crystal layer are set so that the spaces $65_A$ serve as spaces that overlap the borders between the filters of different colors of the color filter between the reflective electrodes 65 and lie in the direction of low transmittance (first direction). The spaces $65_B$ serve as spaces that extend in the direction (second direction) orthogonal to the first direction and lie in the direction of higher transmittance than the first direction. In such a case, the spaces $65_A$ may cause severe discrimination, which can be recognized as uneven display and/or blur of the displayed image or moving image in particular. If the filters of different colors of the color filter are arranged to overlap, the optical characteristics become unstable due to differences in the amount of overlapping in respective positions. Unstable electric fields at pixel edges may cause a liquid crystal domain. Such factors can also make the displayed image unstable.

FIGS. 23A to 23C illustrate examples of a result of observation of light transmitted when displaying one color, where four levels of gradation including no display are available. In FIG. 23A, all pixels are displayed. The proportion of pixels to display in FIG. 23B is less than that in FIG. 23A. The proportion of pixels to display in FIG. 23C is less than that in FIG. 23B. As illustrated in FIGS. 23A to 23C, the light transmitted and output through the spaces $65_A$ is less stable than the light transmitted and output through the spaces $65_B$ when one of R, G, and B colors is displayed and the gradation of pixels to display is changed. Specifically, the amount of light transmitted and output through the spaces $65_A$ varies greatly in ratio, depending on the positions of the spaces $65_A$. As illustrated in FIGS. 23A to 23C, the transflective liquid crystal display device 1 emits more light from the spaces $65_B$ than from the spaces $65_A$ because of the relationship in transmittance and the relationship of the arrangement of the color filter.

As described above, in the transflective liquid crystal display device 1 according to the present embodiment, the spaces $65_A$ are blocked by the signal lines 61 or the light shielding member 80, and the spaces $65_B$ are not blocked, whereby light is prevented from being output from the spaces $65_A$ where the optical characteristics of the transmittance of the color filter are unstable. This can stabilize the light to be output, and suppress the occurrence of blur and unevenness of the display image because of discrimination etc. In the transflective liquid crystal display device 1 according to the present embodiment, the arrangement of the color filter and the rubbing angle and the twist angle of the liquid crystal layer are set so that the spaces $65_A$ are the spaces in the direction of low transmittance (first direction). The spaces $65_A$ can thus be blocked with the signal lines 61 or the light shielding members 80 without much drop in transmittance. In the transmissive display mode, the transflective liquid crystal display device 1 according to the present embodiment can stabilize the optical characteristics of the light to be output while maintaining high light transmittance. This can improve the quality of the displayed image. Since the spaces $65_A$ are blocked by the signal lines 61 or the light shielding members 80 in the transflective liquid crystal display device 1, light loss in the reflective display mode can be reduced as compared to when a black matrix is arranged on the color filter.

Figure 24A:
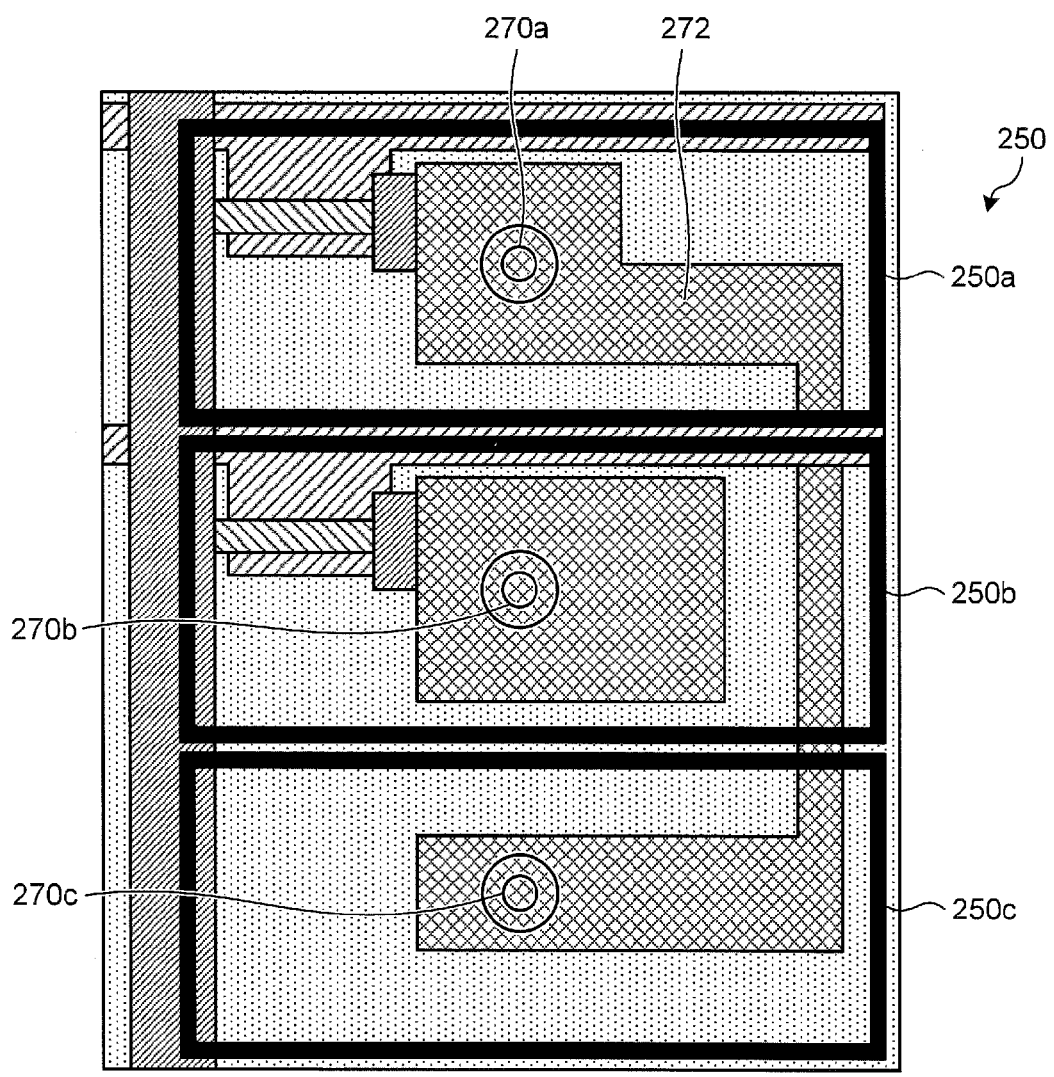
FIG. 24A is a plan view illustrating an electrode structure of another example of the pixel part.
Figure 24B:
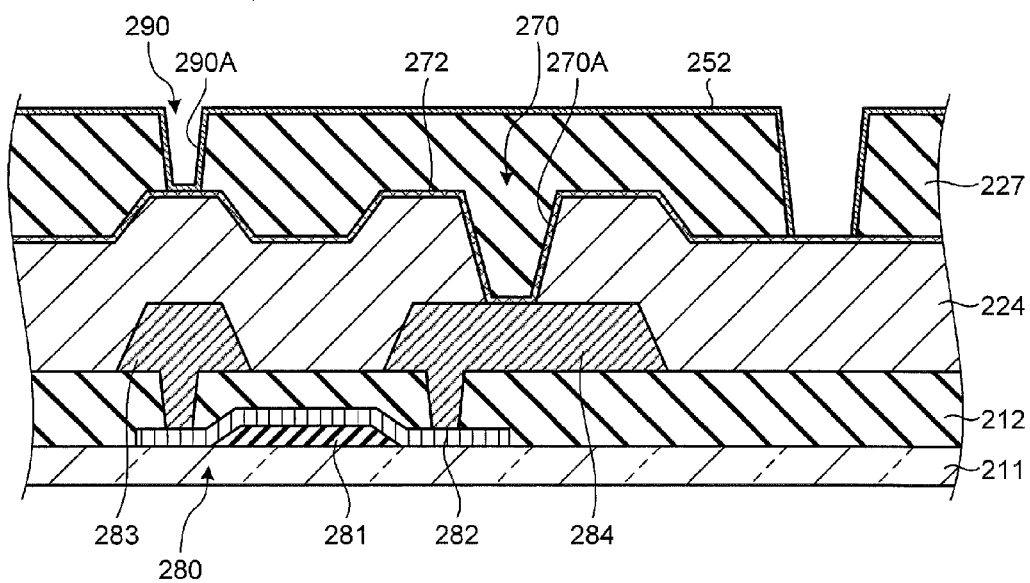
FIG. 24B is a sectional view of the electrode structure illustrated in FIG. 24A.

Next, an example of a TFT substrate that can be suitably used in the transflective liquid crystal display device 1 according to the present embodiment will be described with reference to FIGS. 24A and 24B. FIG. 24A is a plan view illustrating an electrode structure of another example of the pixel part. FIG. 24B is a sectional view of the electrode structure illustrated in FIG. 24A.

A sub-pixel 250 illustrated in FIGS. 24A and 24B includes sub sub-pixels 250a, 250b, and 250c. The sub-pixel 250 switches display in two bits, i.e., four levels of gradation. Reflective electrodes, or pixel electrodes, of the sub sub-pixels 250a, 250b, and 250c are coupled to a drive circuit via contact portions 270a, 270b, and 270c, respectively. The contact portions 270a and 270c of the sub sub-pixels 250a and 250c are coupled by an intermediate wiring layer 272.

As illustrated in FIG. 24B, the first substrate includes, for example, a pixel drive circuit 280 including a TFT and a capacitive element on a transparent substrate 211 which is made of a glass substrate or the like. The transparent substrate 211 may be made of materials other than a glass substrate. Examples thereof include, but are not limited to, a translucent resin substrate, quartz, a silicon substrate, etc. The pixel drive circuit 280 includes a gate electrode 281 which is made of metal such as gold, aluminum, copper, and alloys thereof, bump electrode layers 283 and 284 which function as a source electrode or a drain electrode, and a semiconductor layer 282 which includes a TFT and a capacitive element. The semiconductor layer 282 is covered with an insulation film 212, and coupled to the gate electrode 281 and the bump electrode layers 283 and 284.

The bump electrode layers 283 and 284 have a thickness of, for example, 500 nm to 1000 nm, and protrude above the insulation film 212. To suppress the effect of a difference in level between the thicknesses of the bump electrodes 283 and 284, the bump electrodes 283 and 284 are covered with a first planarization layer 224 and a second planarization layer 227. The first planarization layer 224 has a contact hole 270A to make a first contact portion 270. The intermediate wiring layer (intermediate wiring) 272 and the bump electrode layer 284 are coupled to conduct via the contact hole 270A of the first contact portion 270. For example, the intermediate wiring layer 272 has a thickness of 50 nm to 100 nm. The intermediate wiring layer (intermediate wiring) 272 also couples a reflective electrode to a reflective electrode (pixel electrode) corresponding to the same bit.

The reflective electrode layer 252 is provided on the second planarization layer 227. The second planarization layer 227 has a contact hole 290A to make a second contact portion 290. The intermediate wiring layer 272 and the reflective electrode layer 252 are coupled to conduct via the contact hole 290A of the second contact hole 290. The reflective electrode layer 252 is made of a conductive material that reflects visible light. Examples thereof include, but are not limited to, metal materials such as Ag. The surface of the reflective electrode layer 252 is a mirror surface, for example.

In the transflective liquid crystal display device 1 according to the present embodiment, the first substrate is configured as illustrated in FIGS. 24A and 24B. This allows the reflective electrodes to be shaped flatter for increased reflectance and improved contrast. If the intermediate wiring layer is provided to form multilayer wiring in which the sub sub-pixels included in upper bits are coupled by the intermediate wiring as in the present embodiment, TFT circuit density can be lowered and yields can be improved.

To further planarize the planarization layers, i.e., to form the planarization layers more flatly, it is extremely effective to use high melt flow materials. The melt flowing during high-temperature firing, however, widens the contact holes. The widened areas can cause scatter reflections.

The transflective liquid crystal display device 1 according to the present disclosure uses the intermediate wiring. The first planarization layer 224 is made of a material having a high melt flow characteristic to planarize the circuits, and the intermediate wiring is formed thereon. Unlike the first planarization layer 224, the second planarization layer 227 is then formed by using a material having a low melt flow characteristic. In such a manner, the contact holes in the first layer can be filled with the second planarization layer 227. Contact holes in the second layer can be formed in positions different from the contact holes in the first layer. Since the contact holes in the second planarization layer are made of the material having a low melt flow characteristic, the widening of the contact holes during high-temperature firing is suppressed. A reflective TFT substrate having both flatness and small contact hole diameters can thus be manufactured. Having the layered structure illustrated in FIGS. 24A and 24B, the transflective liquid crystal display device 1 according to the present embodiment can be further improved in performance during reflective display.

Figure 25A:
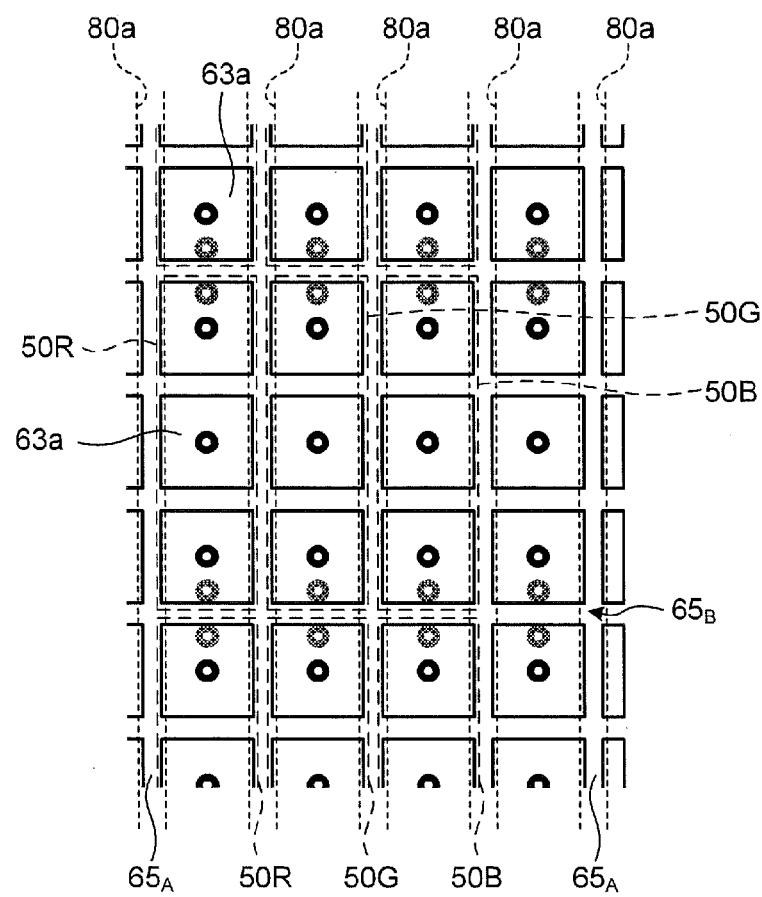
FIG. 25A is a plan view illustrating an electrode structure of another example of the pixel part according to the embodiment.
Figure 25B:
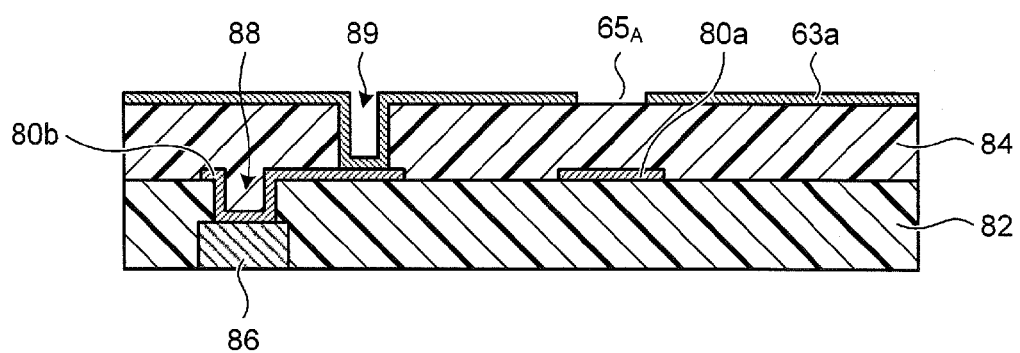
FIG. 25B is a sectional view of the electrode structure illustrated in FIG. 25A.

Next, a preferred arrangement of light shielding members in the layered structure including the intermediate wiring as illustrated in FIGS. 24A and 24B will be described. FIG. 25A is a plan view illustrating an electrode structure of another example of the pixel part according to the embodiment. FIG. 25B is a sectional view of the electrode structure illustrated in FIG. 25A.

In the embodiment, the reflective electrodes 63a are arranged corresponding to sub sub-pixels. As illustrated in FIG. 25B, the first substrate includes a first planarization layer 82 and a second planarization layer 84 which are stacked on each other. Light shielding members 80a and intermediate wiring 80b are arranged in an intermediate wiring layer between the first planarization layer 82 and the second planarization layer 84. The intermediate wiring 80b is coupled to pixel electrode bases (bump electrode layers) 86 in the lower side of the first planarization layer 82 at contact portions 88. The intermediate wiring 80b is coupled to the reflective electrodes 63a on the upper side of the second planarization layer 84 at contact portions 89. In other words, the intermediate wiring 80b couples the reflective electrodes 63a serving as the pixel electrodes to the pixel electrode bases 86 to which signals (voltages) are supplied. When seen in a direction perpendicular to the display surface, the light shielding members 80a of the intermediate wiring layer are arranged in positions overlapping the entire areas of the spaces $65_A$ between the adjacent reflective electrodes 63a. The light shielding members 80a are formed in the same layer as the intermediate wiring 80b. The light shielding members 80a may be coupled to or separated from the intermediate wiring 80b.

Since the light shielding members 80a are arranged in the same layer as the intermediate wiring, the light shielding members can be formed on the planarization layer 82. This can shape the light shielding members 80a flatter, whereby the light shielding members can be formed in a flat shape. The light shielding members can be formed near the reflective electrodes.

The surfaces, i.e., light-reflecting surfaces of the reflective electrodes 63 and 63a are desirably made of aluminum (Al) or silver (Ag). This can increase the reflectance of the reflective electrodes for efficient reflection of light. If the material (metal and/or conductor) formed in the intermediate wiring or the intermediate wiring layer is used as the light shielding members and the pixel electrode bases are made of a semiconductor, the material of the intermediate wiring is desirably determined to have a work function selected for ohmic coupling. To make the reflective electrodes as flat as possible, the intermediate wiring layer desirably has a small thickness (for example, less than 100 nm) that provides a sufficient light shielding characteristic (OD)>Log (transmission CR). Herein, OD is –Log (transmittance). The surface-side metal of the intermediate wiring desirably has ionization energy higher than that of the reflective electrodes so that the intermediate wiring will not disappear during etching of the reflective electrodes. The surface-side metal of the pixel electrode bases desirably has ionization energy higher than that of the intermediate wiring (light shielding members) so that the pixel electrode bases will not disappear during etching of the intermediate wiring (light shielding members). The pixel electrode bases may be made of a material that functions as an Si material for transistors. If the intermediate wiring and the pixel electrode bases are made of a semiconductor, the metal that makes contact with the semiconductor shall be one that forms an ohmic junction. The metal satisfies qΦM<qΦs, where qΦM is the work function of the metal and qΦs is the work function of the semiconductor.

The intermediate wiring layer is desirably made of Mo or Ti. This can suppress the disappearance and thinning of the metal during processing (etching) of the reflective electrodes. Mo can be used to form the intermediate wiring layer out of the same material as that of the scan lines of the TFTs.

The pixel electrode bases are desirably made of Mo or Ti. This can suppress the disappearance and thinning of the metal during processing (etching) of the intermediate wiring. The pixel electrode bases are desirably made of Ti/Al/Ti or Mo/Al/Mo. In such a case, the pixel electrode bases can be made of the same material as that of the signal lines of the TFTs. The pixel electrode bases are desirably made of Si. In such a case, the pixel electrode bases can be made of the same material as that of a base.

If the transflective liquid crystal display device 1 includes MIPs as described above, i.e., if the transflective liquid crystal display device 1 is a memory built-in TFT display device, the reflective pixels need to be formed on the TFT substrate which has a high circuit density and a complicated layout. On the other hand, if the intermediate wiring is used like the present embodiment, the arrangement of contact holes, which affects the image quality, can be freely determined by using the layout (design) of the intermediate wiring on the first planarization layer. This can reduce the circuit density and allows a design tailored to the memories and pixel switches.

If the transflective liquid crystal display device 1 includes MIPs as described above, the light shielding members are desirably formed in the intermediate wiring layer. More specifically, the light shielding members are desirably formed in the intermediate wiring layer in which the intermediate wiring for coupling the reflective electrodes to part of the circuits of the memory functions is formed, by using the same material as that of the intermediate wiring. If the transflective liquid crystal display device 1 includes no MIP as described above, the spaces that overlap the borders of the color filter and have lower transmittance are desirably blocked with the wiring of the signal lines or scan lines that extend in the direction overlapping the spaces.

2-8. Display Mode of Liquid Crystal

Figure 26:
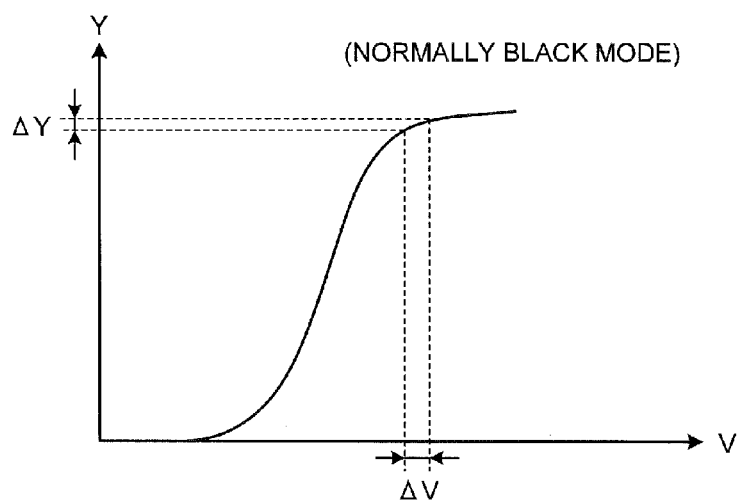
FIG. 26 is a diagram illustrating an example of a relationship between an applied voltage and reflectance in a normally black mode.
Figure 27:
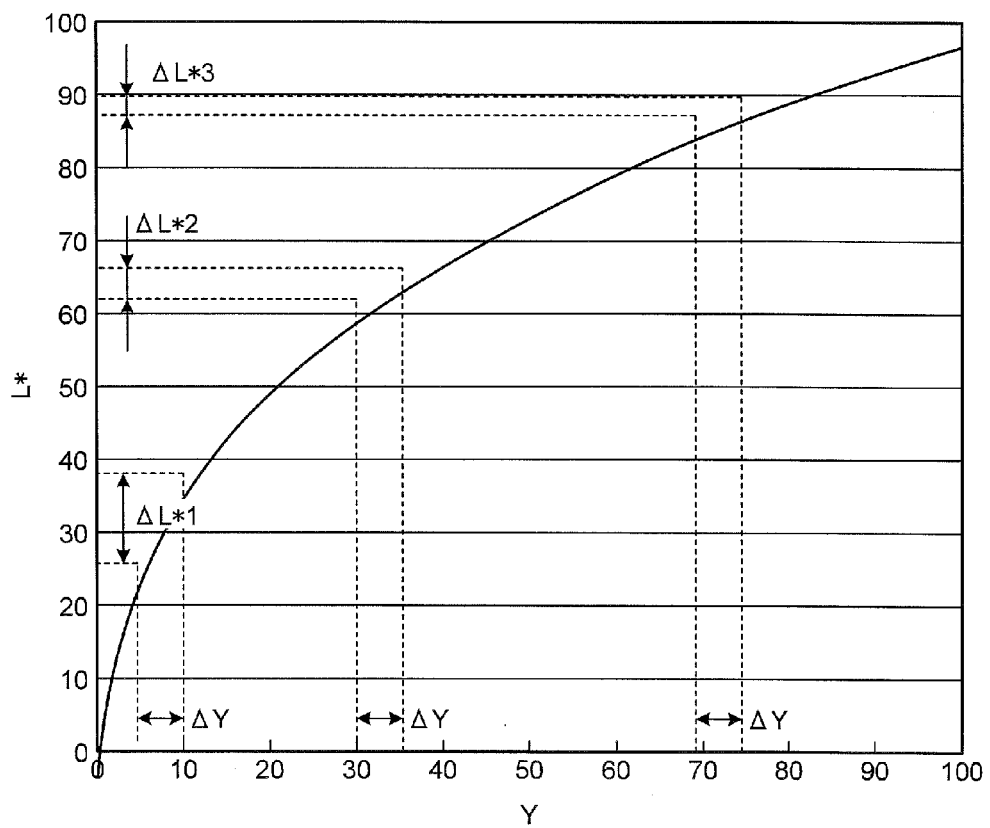
FIG. 27 is a diagram illustrating an example of a relationship between reflectance and lightness.
Figure 28:
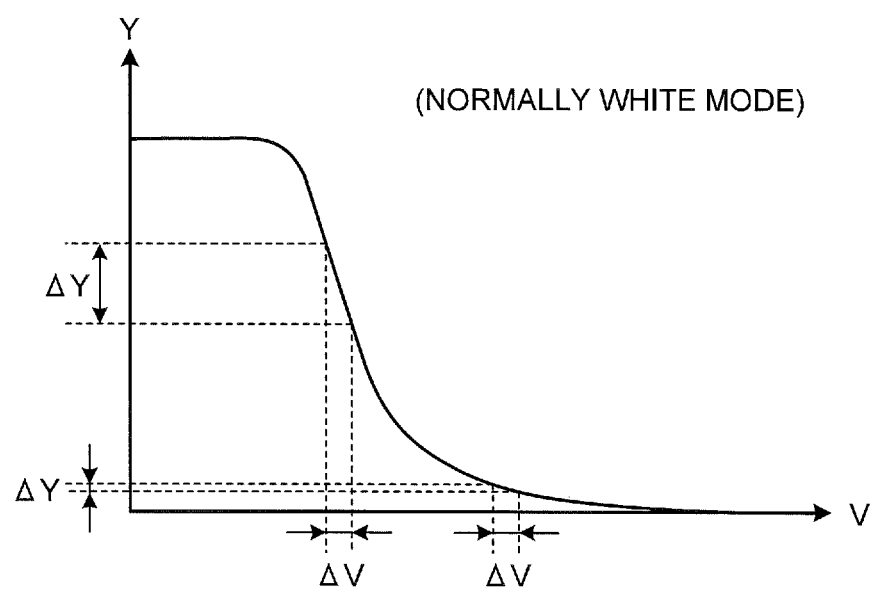
FIG. 28 is a diagram illustrating an example of a relationship between an applied voltage and reflectance in the normally white mode.

FIG. 26 schematically illustrates a relationship between an applied voltage V and reflectance Y in the normally black display mode. FIG. 27 schematically illustrates a relationship between the reflectance Y and luminance L*. FIG. 28 schematically illustrates a relationship between the applied voltage V and the reflectance Y in the normally white display mode as a comparative example.

As described above, in the present embodiment, the liquid crystal display panel is in the normally black display mode having the relationship as illustrated in FIG. 26 as an example. For example, if a drive circuit applies a potential difference such that the video display surface displays white to a liquid crystal element, the liquid crystal element to which the potential difference is applied provides a predetermined reflectance.

Depending on optical design, a difference ΔY in reflectance may have a magnitude that cannot be approximated to zero. For example, suppose that a predetermined value (constant value) of difference ΔY in reflectance is given regardless of the magnitude of the reflectance Y. In such a case, the higher the reflectance Y (the higher the luminance), the smaller a lightness difference ΔL* in consideration of visibility. That is, as illustrated in FIG. 27, a lightness difference ΔL*2 in consideration of visibility corresponding to a difference ΔY in reflectance near a reflectance of 30% is smaller than a lightness difference ΔL*1 in consideration of visibility corresponding to the difference ΔY in reflectance near a reflectance of 10%. A lightness difference ΔL*3 in consideration of visibility corresponding to the difference ΔY in reflectance near a reflectance of 70% is smaller than the lightness difference ΔL*2 in consideration of visibility corresponding to the difference ΔY in reflectance near the reflectance of 30%. Therefore, if the liquid crystal display panel is in the normally black display mode, luminance variations of white display are small even if the difference ΔY in reflectance has a magnitude that cannot be approximated to zero. The occurrence of flicker can thus be suppressed even if common coupling lines fluctuate in voltage.

As illustrated in FIG. 28, the foregoing does not apply to the case where the liquid crystal display panel is in the normally white display mode. If the liquid crystal display panel is in the normally white display mode, the lightness of black display in consideration of visibility varies. Variations in the lightness of black display in consideration of visibility cause flicker, which degrades the display quality.

In the present embodiment, the liquid crystal inversion frequency for video display is lower than 30 Hz (or 60 fps). This can suppress power consumption. Since variations in white luminance are suppressed as described above, noticeable flicker will not occur even at the liquid crystal inversion frequency of below 60 Hz.

In summary, according to the present embodiment, video display is performed by area coverage modulation and in the normally black mode. The area conversion modulation expresses gradations by using black and white, two values without using halftones. The normally black mode provides stable luminance even if the applied voltage varies during white display. For example, stable luminance is provided even if the voltage applied to the liquid crystal layer 30 of each pixel 50 drops during a frame period when performing the frame inversion driving method, a 1H inversion driving method, etc. The provision of stable luminance can suppress the occurrence of flicker even if the driving frequency is low. Consequently, according to the present embodiment, the power consumption can be reduced while suppressing the occurrence of flicker.

2-9. Specific Example

A specific example of the transflective liquid crystal display device according to the present embodiment will be described. The following description will be given by using an example where the normally black mode is employed as a display mode, and an electrically controlled birefringence (ECB) mode is employed as an operation mode. It should be noted that the operation mode is not limited to the ECB mode, and a vertically aligned (VA) mode, a fringe field switching (FFS) mode, and the like may be employed.

An example will be described by using the cross sections illustrated in FIGS. 11A and 11B. FIGS. 11A and 11B illustrate the sectional structure of two pixels adjacent in the column direction (Y direction) and the row direction (X direction) of the transflective liquid crystal display device 1a according to the example of the present embodiment, respectively. In FIGS. 11A and 11B, similar parts to those of FIG. 1 are designated by the same reference numerals. As illustrated in FIGS. 11A and 11B, a first panel unit 10 includes a polarization plate 11, a half-wave plate 12, a quarter-wave plate 13, a first substrate 14 serving as a TFT substrate, and a planarization film 15 which are arranged in order from the side opposite from a liquid crystal layer 30. Reflective electrodes 63 are formed on the planarization film 15 pixel by pixel.

In the first panel unit 10, the reflective electrodes 63 are formed in a size similar to a pixel size. The areas of the reflective electrodes 63 constitute reflective display areas (reflective display portions). A space $65_A$ is formed in the column direction (Y direction) between the reflective electrodes 63 of two pixels adjacent in the row direction (X direction). As illustrated in FIG. 11A, a space $65_B$ is formed in the row direction between the reflective electrodes 63 of two pixels adjacent in the column direction.

Signal lines 61 for transmitting video signals to the pixels pixel column by pixel column are laid on the first substrate 14. The signal lines 61 are formed in the reflective display areas to overlap the spaces $65_A$ extending in the column direction so that the spaces $65_A$ extending in the column direction are blocked. Scan lines 62 (see FIG. 11A) for transmitting scan signals to the pixels pixel row by pixel row are formed in the reflective display areas so as not to block the spaces $65_B$ extending in the row direction, and desirably not to overlap the spaces $65_B$.

The spaces $65_B$ between the reflective electrodes 63 where no scan line 62 overlaps are used as transmissive display areas. The pixel structure according to the present example is a single gap structure in which the liquid crystal layer 30 has the same thickness, or cell gap, in the reflective display areas and the transmissive display areas.

A second panel unit 20 is opposed to the first panel unit 10 with the liquid crystal layer 30 therebetween. The second panel unit 20 includes a transparent electrode 21, a color filter 22, a second substrate 23, a quarter-wave plate 24, a half-wave plate 25, and a polarization plate 26 which are arranged in order from the side of the liquid crystal layer 30. FIG. 11B illustrates the pixel structure of two pixels adjacent in the row direction, for example, an R sub-pixel for displaying red and a G sub-pixel for displaying green.

Figure 29A:
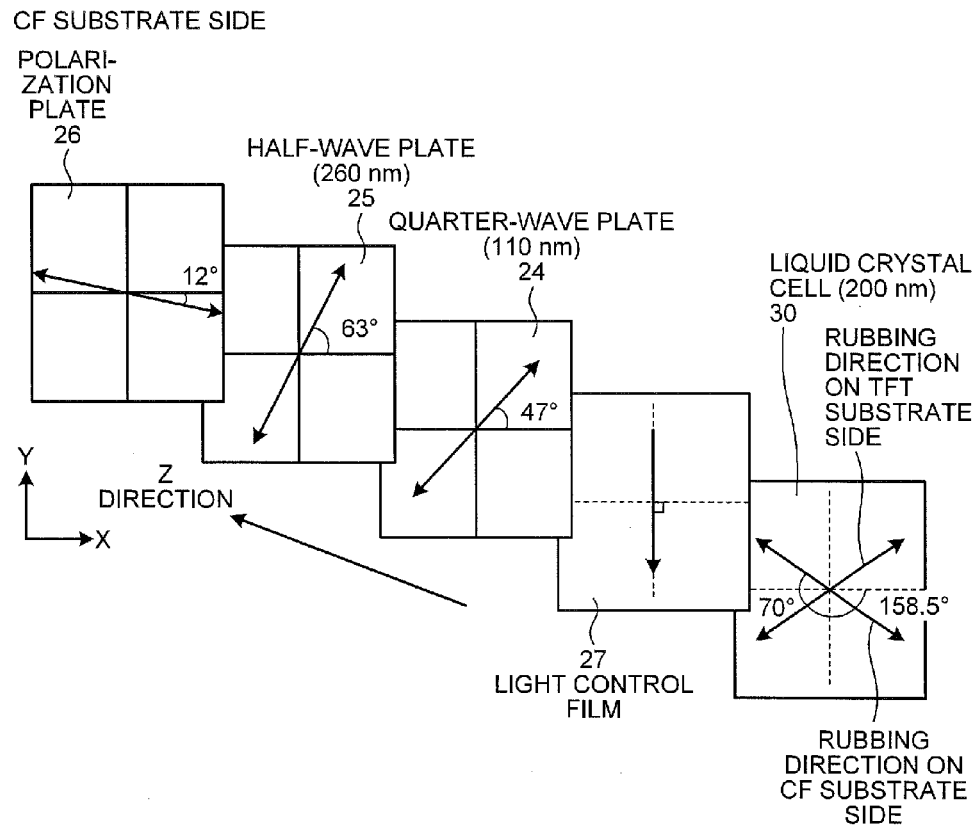
FIG. 29A is a diagram illustrating an example of optical design in a normally black ECB mode with a single gap structure.
Figure 29B:
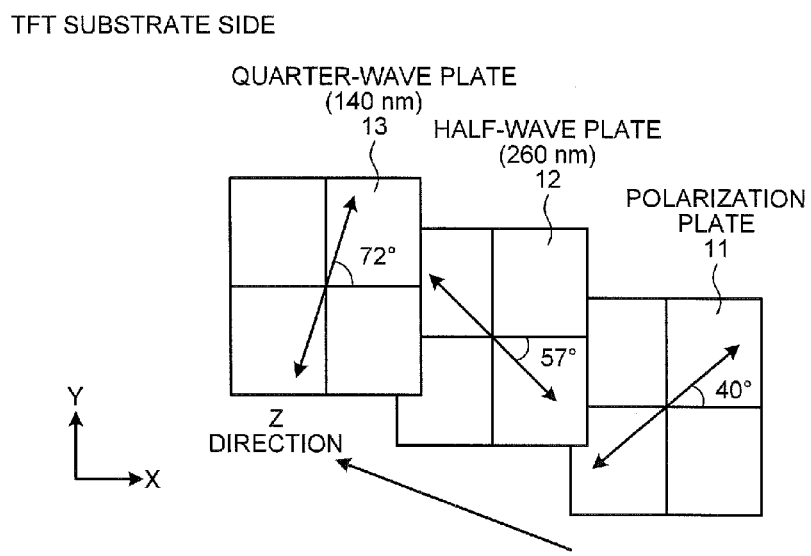
FIG. 29B is a diagram illustrating an example of optical design in the normally black ECB mode with the single gap structure.

An example of optical design of the normally black ECB mode with the foregoing single gap structure is illustrated in FIGS. 29A and 29B. FIGS. 29A and 29B illustrate respective axis directions of components of the first panel unit 10, a liquid crystal cell (liquid crystal layer 30), and components of the second panel unit 20. Specifically, for the CF substrate side, FIG. 29A illustrates an absorption axis direction of the polarization plate 26, an extension axis direction of the half-wave plate 25, an extension axis direction of the quarter-wave plate 24, a direction of extension of a light control film 27, and rubbing directions of the liquid crystal cell on the TFT substrate side and the CF substrate side. For the TFT substrate side, FIG. 29B illustrates the extension axis direction of the quarter-wave plate 13, the extension axis direction of the half-wave plate 12, and the absorption axis direction of the polarization plate 11.

Figure 30A:
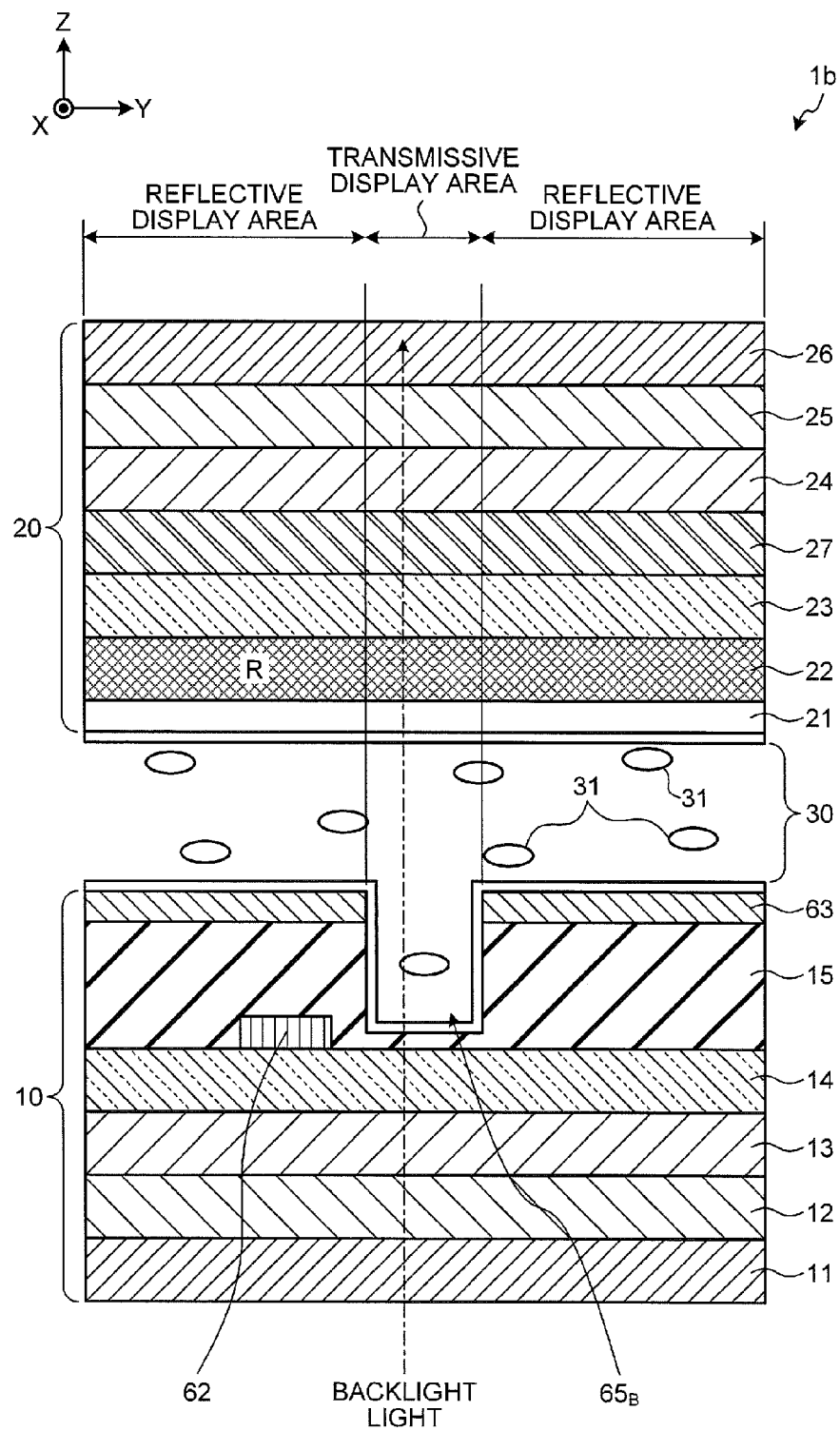
FIG. 30A is a sectional view illustrating a sectional structure of two pixels adjacent in a column direction of a transflective liquid crystal display device having a multi-gap structure.
Figure 30B:
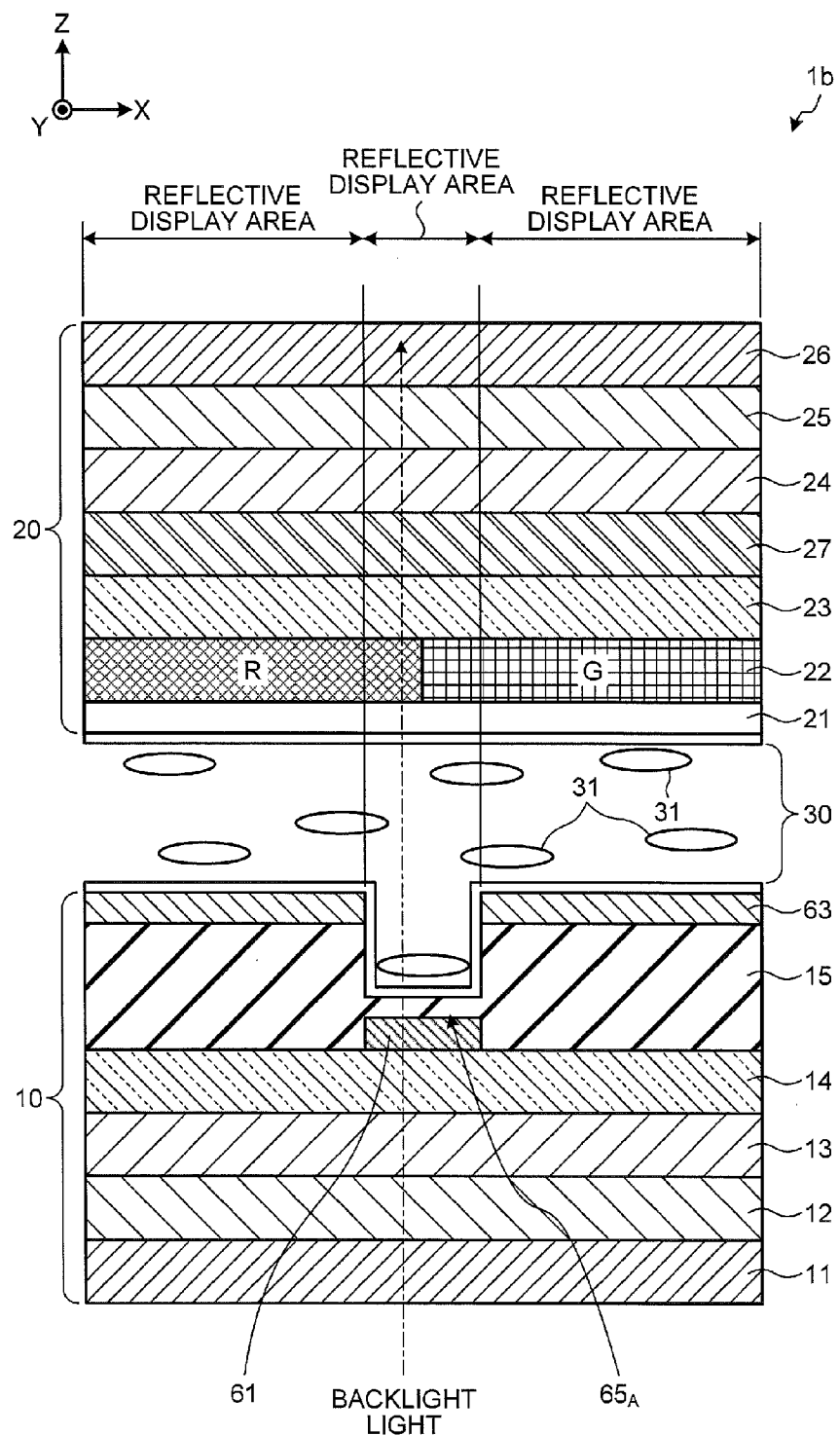
FIG. 30B is a sectional view illustrating a sectional structure of two pixels adjacent in a row direction of the transflective liquid crystal display device having the multi-gap structure.

In FIGS. 29A and 29B, respective numerical values indicate degrees and phase differences (retardations) of the axis directions. The phase differences are expressed in numerical values converted into wavelengths when light having a wavelength of 550 [nm] is incident on the respective components of the first and second panel units 10 and 20. The specific example has been described by using the single gap structure as an example. However, a multi-gap structure such as illustrated in FIGS. 30A and 30B where the cell gap varies between the reflective display areas and the transmissive display areas may be used. FIG. 30A is a sectional view illustrating a sectional structure of two pixels adjacent in the column direction of the transflective liquid crystal display device having the multi-gap structure. FIG. 30B is sectional view illustrating a sectional structure of two pixels adjacent in the row direction of the transflective liquid crystal display device having the multi-gap structure.

As illustrated in FIGS. 30A and 30B, the transflective liquid crystal display device 1b has the multi-gap structure. In such a case, grooves need to be formed in the spaces $65_A$ ($65_B$) between the reflective electrodes 63 to create a difference in level between the reflective display areas and the transmissive display areas. This increases the number of processes as compared to the single gap structure. From the viewpoint of processes, the single gap structure with fewer processes than the multi-gap structure is preferred.

Figure 31:
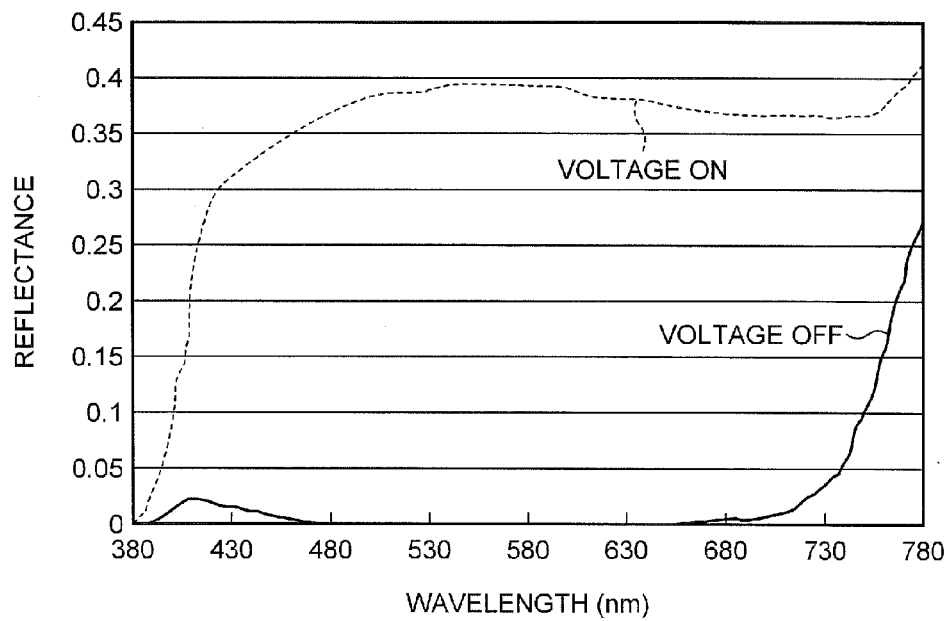
FIG. 31 is a diagram illustrating a result of spectrum calculation in a reflective display area.
Figure 32:
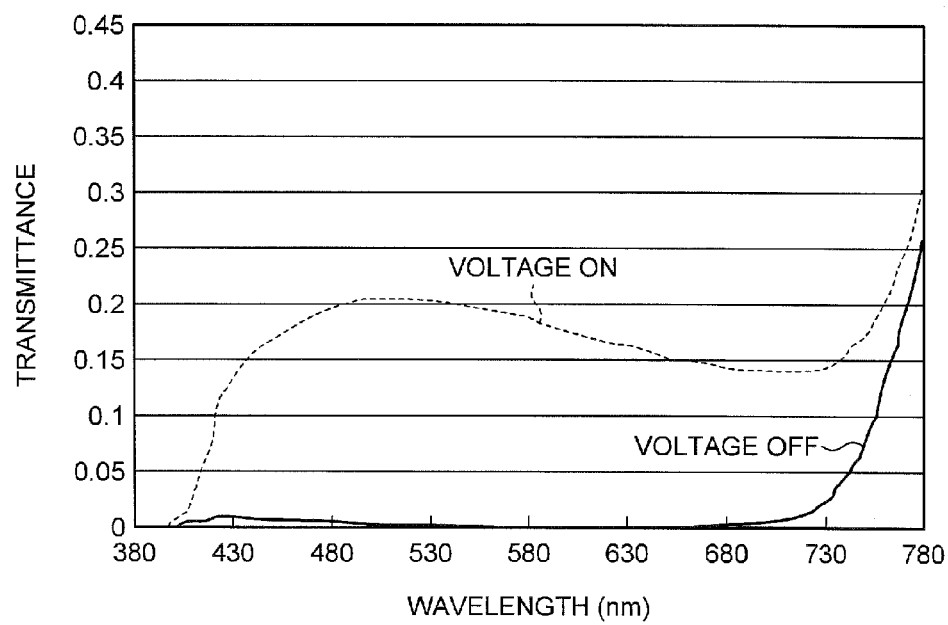
FIG. 32 is a diagram illustrating a result of spectrum calculation in a transmissive display area.

FIGS. 31 and 32 illustrate results of spectrum calculation in a reflective display area and a transmissive display area when a voltage is made ON and OFF with respect to upper and lower electrodes, i.e., the counter electrode (transparent electrode 21) and the pixel electrodes (reflective electrodes 63), with the optical design (single gap structure) illustrated in FIGS. 29A and 29B. "Voltage ON" refers to a state where the voltage is applied between the upper and lower electrodes. "Voltage OFF" refers to a state where the voltage is not applied between the upper and lower electrodes.

FIG. 31 illustrates the result of spectrum calculation of reflectance in a reflective display area. FIG. 32 illustrates the result of spectrum calculation of transmittance in a transmissive display area. The results of spectrum calculation are not for situations where the distribution of the electric field between the pixels is reproduced, but for situations where the electric field between the upper and lower electrodes acts fully on liquid crystal molecules. Unlike an ordinary multi-gap structure of transflective type, the single gap structure has small phase differences and low transmittance in the transmissive display area.

3. Modification

In the foregoing embodiment, the signal lines 61 and the scan lines 62 are configured as straight stripe wiring. The signal lines 61 have a wiring structure so as to overlap the spaces $65_A$ extending in the column direction. The scan lines 62 have a wiring structure so as to overlap the reflective electrodes 63 of pixels 50 arranged between the spaces $65_B$ extending in the row direction and not to overlap the spaces $65_B$ (see FIG. 4A). However, such wiring structures of the signal lines 61 and the scan lines 62 are just an example, and the present disclosure is not limited thereto.

FIG. 33 illustrates an example of a possible wiring structure, in which the signal lines 61 and the scan lines 62 are bent to form meandering wiring. The meandering wiring is laid as follows: The signal lines 61 are laid between the pixels adjacent in the row direction so that the signal lines 61 pass through intersections $65_C$ of the spaces $65_A$ formed in the column direction and the spaces $65_B$ formed in the row direction. Specifically, the signal lines 61 are laid so that their bent portions $61_A$ are positioned at the intersections $65_C$. The scan lines 62 are laid between the pixels adjacent in the column direction so that the scan lines 62 pass through the intersections $65_C$ of the spaces $65_B$ formed in the row direction and the spaces $65_A$ formed in the column direction. Specifically, the scan lines 62 are laid so that their bent portions $62_A$ are positioned at the intersections $65_C$.

Liquid crystal molecules do not move at all in the center positions C between the pixels. The centers of the intersections $65_C$ of the spaces $65_A$ formed in the column direction and the spaces $65_B$ formed in the row direction are therefore considered to be most adversely affected during transmissive display. The signal lines 61 and the scan lines 62 may be laid to pass through the intersections $65_C$ as in the foregoing wiring structure. In such a case, more favorable transmissive display is considered to be able to be provided as compared to when the latter wiring structure is employed.

The signal lines 61 may be configured as straight stripe wiring, and the scan lines 62 may be configured as meandering wiring. In such a case, the signal lines 61 may be arranged so as to overlap the spaces $65_A$ as illustrated in FIG. 4A, and the scan lines 62 may be arranged so that their bent portions $62_A$ are positioned at the intersections $65_C$ as illustrated in FIG. 33.

4. Electronic Apparatuses

The transflective liquid crystal display devices according to the present disclosure described above can be used as a display section (display device) of an electronic apparatus in every field which displays a video signal input to the electronic apparatus or a video signal generated inside the electronic apparatus as an image or a video image.

The transflective liquid crystal display devices according to the present disclosure are desirably used as a display section (display device) of a portable electronic apparatus which is frequently used outdoors among electronic apparatuses in all fields. Examples of the portable electronic apparatus include, but are not limited to, portable information apparatuses such as a digital camera, a video camera, a personal digital assistant (PDA), a game machine, a notebook personal computer, and an electronic book, portable communication apparatuses such as a mobile phone, etc.

As is clear from the foregoing description of the embodiment, the transflective liquid crystal display devices according to the present disclosure can achieve transmissive display while maintaining reflective display performance equivalent to that of a reflective display device. The transflective liquid crystal display devices according to the present disclosure can thus fully provide the characteristics of a reflective liquid crystal display device, namely, low power consumption and an easy-to-view screen even in a bright environment. The use of the transflective liquid crystal display devices according to the present disclosure as a display section of electronic apparatuses in all fields, and portable electronic apparatuses in particular, can contribute significantly to reduced power consumption of the portable electronic apparatuses.

Specific examples of an electronic apparatus that uses the transflective liquid crystal display device(s) 1 and/or 1a according to the present disclosure as a display section, i.e., an electronic apparatus according to the present disclosure will be described below.

Figure 34A:
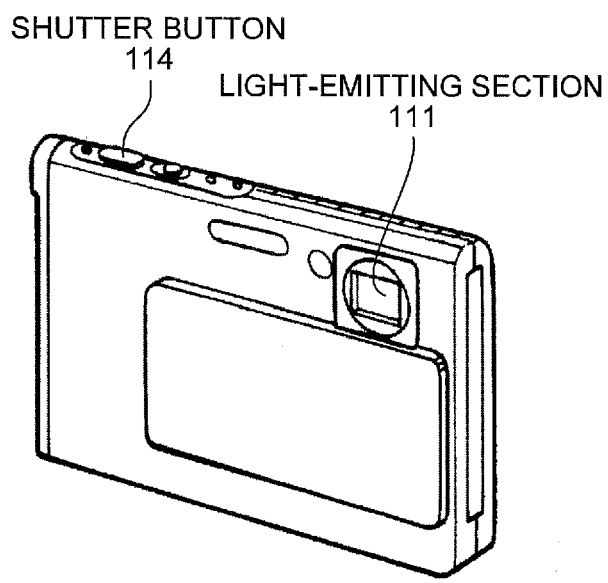
FIG. 34A is a perspective view illustrating an appearance of a digital camera to which the present disclosure is applied.
Figure 34B:
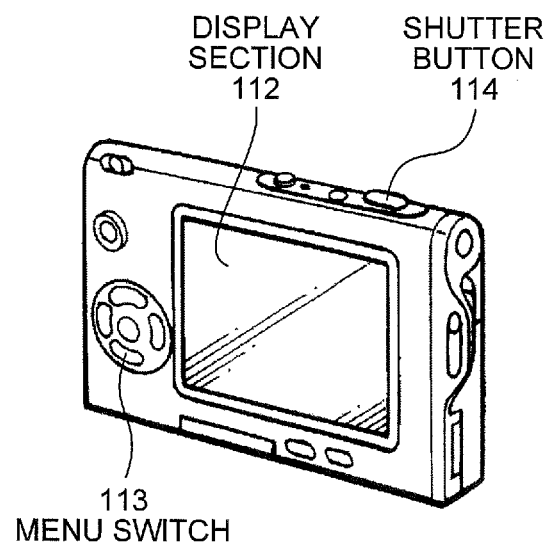
FIG. 34B is a perspective view illustrating the appearance of the digital camera to which the present disclosure is applied.

FIG. 34A is a perspective view illustrating an appearance of a digital camera to which the present disclosure is applied, as seen from a front side. FIG. 34B is a perspective view of the digital camera as seen from a rear side. The digital camera according to the present application example includes a light-emitting section 111 for flash, a display section 112, menu switches 113, a shutter button 114, etc. The digital camera is fabricated by using the transflective liquid crystal display device 1 or 1a according to the present disclosure as the display section 112.

Figure 35:
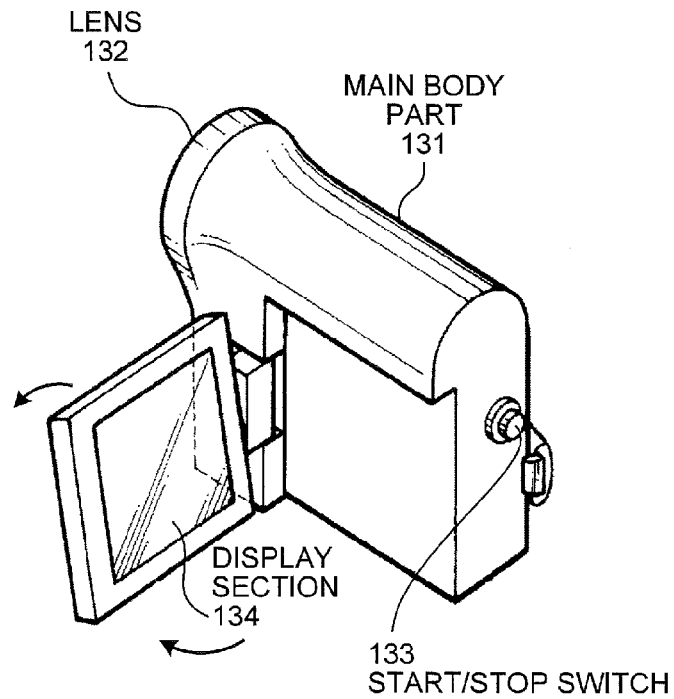
FIG. 35 is a perspective view illustrating an appearance of a video camera to which the present disclosure is applied.

FIG. 35 is a perspective view illustrating an appearance of a video camera to which the present disclosure is applied. The video camera according to the present application example includes a main body part 131, a lens 132 for object shooting arranged on a side surface facing forward, a start/stop switch 133 for shooting, a display section 134, etc. The video camera according to the present application example is fabricated by using the transflective liquid crystal display device 1 or 1a according to the present disclosure as the display section 134.

Figure 36:
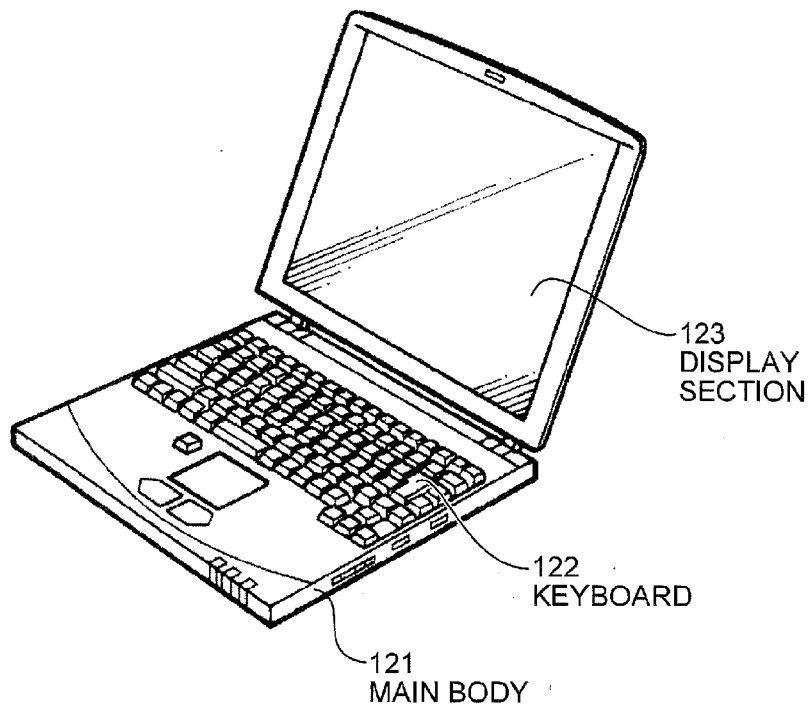
FIG. 36 is a perspective view illustrating an appearance of a notebook personal computer to which the present disclosure is applied.

FIG. 36 is a perspective view illustrating an appearance of a notebook personal computer to which the present disclosure is applied. A main body 121 of the notebook personal computer according to the present application example includes a keyboard 122 which is operated when inputting characters and the like, a display section 123 which displays an image, etc. The notebook personal computer according to the present application example is fabricated by using the transflective liquid crystal display device 1 or 1a according to the present disclosure as the display section 123.

Figure 37A:
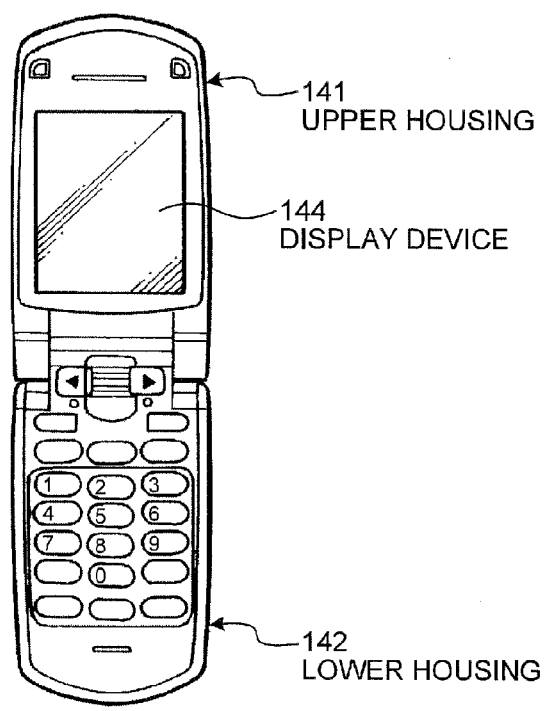
FIG. 37A is a front view illustrating, in an open state, a mobile phone to which the present disclosure is applied.
Figure 37B:
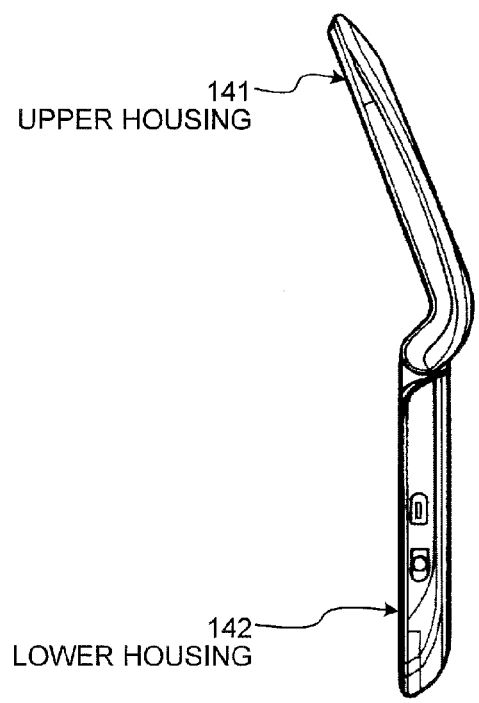
FIG. 37B is a side view illustrating the mobile phone to which the present disclosure is applied.
Figure 37C:
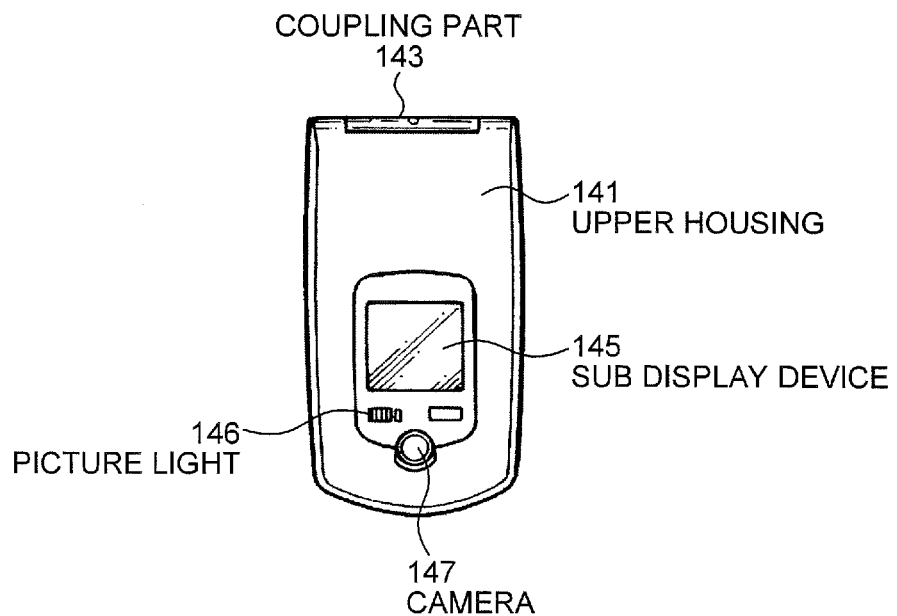
FIG. 37C is a front view illustrating, in a closed state, the mobile phone to which the present disclosure is applied.
Figure 37D:
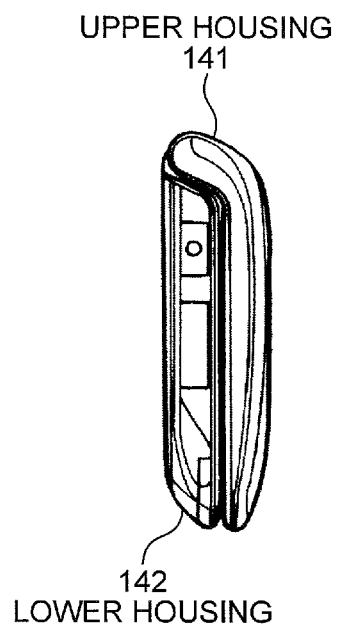
FIG. 37D is a left side view illustrating the mobile phone to which the present disclosure is applied.
Figure 37E:
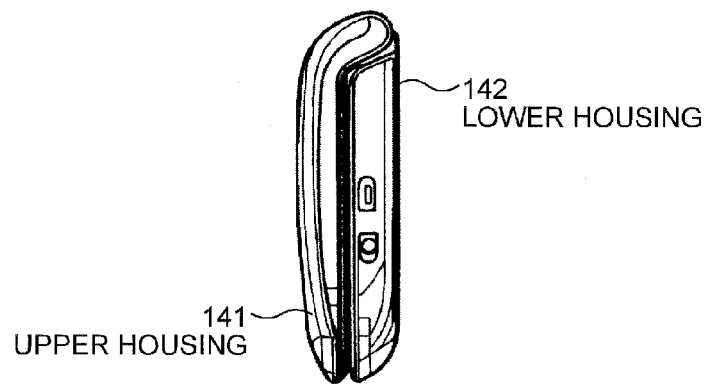
FIG. 37E is a right side view illustrating the mobile phone to which the present disclosure is applied.
Figure 37F:
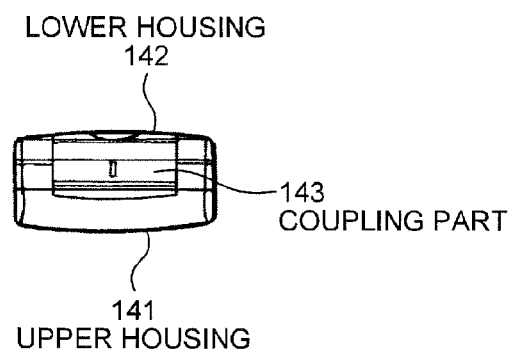
FIG. 37F is a top view illustrating the mobile phone to which the present disclosure is applied.
Figure 37G:
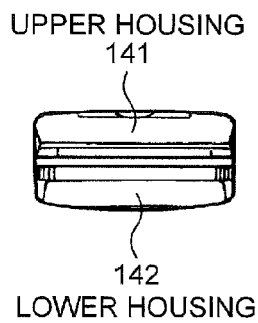
FIG. 37G is a bottom view illustrating the mobile phone to which the present disclosure is applied.

FIGS. 37A to 37G are appearance diagrams illustrating a portable communication apparatus, for example, a mobile phone to which the present disclosure is applied. FIG. 37A is a front view of the mobile phone in an open state. FIG. 37B is a side view thereof. FIG. 37C is a front view in a closed state. FIG. 37D is a left side view. FIG. 37E is a right side view. FIG. 37F is a top view. FIG. 37G is a bottom view.

The mobile phone according to the present application example includes an upper housing 141, a lower housing 142, a coupling part (hinge unit) 143, a display device 144, a sub display device 145, a picture light 146, a camera 147, etc. The mobile phone according to the present application example is fabricated by using the transflective liquid crystal display device(s) 1 and/or 1a as the display device 144 and/or the sub display device 145.

Figure 38:
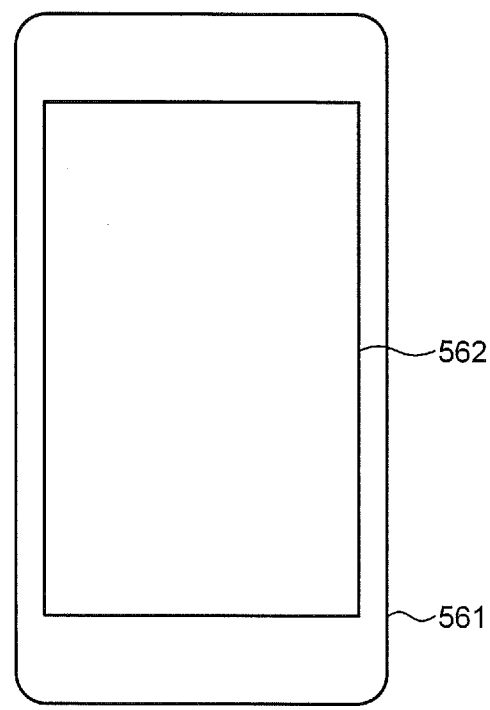
FIG. 38 is a front view illustrating a personal digital assistant to which the present disclosure is applied.

FIG. 38 is a front view illustrating a personal digital assistant to which the present disclosure is applied. The personal digital assistant serving as an example of an electronic apparatus to which the present disclosure is applied functions as a portable computer, a multifunctional mobile phone, a portable computer capable of voice communication, and/or a portable computer capable of communication. The personal digital assistant is sometimes referred to as a so-called smartphone or tablet terminal. For example, the personal digital assistant includes a display section 562 on the surface of a casing 561. The display section 562 is the transflective liquid crystal display device according to the present embodiment.

5. Aspects of the Present Disclosure

The present disclosure includes the following aspects:
(1) A transflective liquid crystal display device comprising:
 a plurality of reflective electrodes that are arranged for a plurality of pixels, respectively;
 a first substrate on which the reflective electrodes are arranged;
 a transparent electrode that is opposed to the reflective electrodes;
 a second substrate on which the transparent electrode is provided;
 a liquid crystal layer that is provided between the first substrate and the second substrate; and
 a color filter that is provided closer to the transparent electrode than the reflective electrodes, and includes filters of a plurality of colors, the filters of the respective colors being arranged corresponding to the pixels, wherein
 the first substrate is provided with a first space between reflective electrodes of adjacent pixels and a second space between reflective electrodes of adjacent pixels, the first space extending in a first direction and overlapping a border between filters of different colors of the color filter, the second space extending in a second direction intersecting the first direction and having transmittance higher than that of the first space,
  the first substrate includes a light shielding member that is positioned in an entire area of the first space,
  reflective display is performed by using the reflective electrodes, and
  transmissive display is performed by using the second space where the light shielding member is not positioned.
(2) The transflective liquid crystal display device according to (1), wherein the second direction is a direction orthogonal to the first direction.
(3) The transflective liquid crystal display device according to (1) or (2), wherein the filters of different colors of the color filter overlap each other in an area overlapping the first space.
(4) The transflective liquid crystal display device according to any one of (1) to (3), wherein the light shielding member is composed of signal lines that are formed for respective pixel columns of a matrix arrangement of the pixels and transmit signals for driving the pixels.
(5) The transflective liquid crystal display device according to (4), wherein:
 the first substrate is provided with scan lines that are formed for respective pixel rows of the matrix arrangement of the pixels and transmit signals for selecting the pixels; and the scan lines are laid to circumvent a space formed in a direction of arrangement of the pixels in the pixel rows.

(6) The transflective liquid crystal display device according to any one of (1) to (3), wherein:
the pixels have a memory function; and
the light shielding member is formed in an intermediate wiring layer in which intermediate wiring coupling the reflective electrodes to part of a circuit of the memory function is formed, the light shielding member being made of the same material as that of the intermediate wiring.

(7) The transflective liquid crystal display device according to (6), wherein the pixels include a memory unit that stores data.

(8) The transflective liquid crystal display device according to (6) or (7), wherein the pixels use a memory type liquid crystal.

(9) The transflective liquid crystal display device according to any one of (1) to (8), wherein the liquid crystal layer includes a group of liquid crystal molecules provided between the first substrate and the second substrate, a long axis direction of the group of liquid crystal molecules being parallel to an orientation film on the first substrate side and an orientation film on the second substrate side and twisted between the first substrate and the second substrate.

(10) The transflective liquid crystal display device according to any one of (1) to (9), wherein a rubbing direction on the first substrate side has an angle in a range of −45 degrees to 0 degrees, 0 degrees to 45 degrees, −135 degrees to −180 degrees, or 135 degrees to 180 degrees with respect to a row direction of the plurality of pixels arranged in a matrix.

(11) An electronic apparatus comprising the transflective liquid crystal display device according to any one of (1) to (10).

In the transflective liquid crystal display device having the foregoing configuration and the electronic apparatus including the transflective liquid crystal display device, performing transmissive display by using the space between the reflective electrodes refers to using an area of the space between the reflective electrodes as a transmissive display area. This eliminates the need to secure a dedicated area for transmissive display within a pixel. In other words, the reflective electrode lying in a pixel may have a size (area) equivalent to that of a reflective electrode of a reflective display device. Consequently, transmissive display can be achieved through the space between the reflective electrodes while maintaining reflective display performance equivalent to that of a reflective display device.

The light shielding member is arranged in the first space which extends in the first direction between the reflective electrodes, overlaps the border between the filters of different colors of the color filter, and has transmittance lower than that of the second space extending in the second direction, whereby transmission of light through the first space is suppressed. This can stabilize optical characteristics while suppressing a drop in transmittance. As a result, transmissive display can be achieved through the space between the reflective electrodes while maintaining reflective display performance equivalent to that of a reflective display device.

According to the present disclosure, transmissive display is performed by using the space between the reflective electrodes of adjacent pixels. Transmissive display can thus be achieved while maintaining reflective display performance equivalent to that of a reflective display device.

The embodiments of the present disclosure are not limited by the foregoing descriptions. Further, the components in the above described embodiments include components easily conceivable by those skilled in the art and components substantially identical, in other words, components that are within the range of equivalency. Furthermore, the components described above can be appropriately combined with one another. Moreover, various omissions, alternatives and variations of the components may be possible within the scope of the above embodiments.

What is claimed is:

1. A transflective liquid crystal display device comprising:
a plurality of reflective electrodes that are arranged for a plurality of pixels, respectively;
a first substrate on which the reflective electrodes are arranged;
a transparent electrode that is opposed to the reflective electrodes;
a second substrate on which the transparent electrode is provided;
a liquid crystal layer that is provided between the first substrate and the second substrate; and
a color filter that is opposed to the reflective electrodes and includes filters of a plurality of colors, the filters of the respective colors being arranged corresponding to the pixels, a border between adjacent filters corresponding to a border between adjacent pixels, wherein
the first substrate is provided with a first space between reflective electrodes of adjacent pixels and a second space between reflective electrodes of adjacent pixels, the first space extending in a first direction and overlapping a border between filters of different colors of the color filter, the second space intersecting the first space and extending in a second direction intersecting the first direction,
colors of respective filters corresponding to reflective electrodes adjacent across the first space are different from one another,
a light shielding member is positioned in an entire area of the first space,
reflective display is performed by using the reflective electrodes, and
transmissive display is performed by using the second space where the light shielding member is not positioned.

2. The transflective liquid crystal display device according to claim 1, wherein the second direction is a direction orthogonal to the first direction.

3. The transflective liquid crystal display device according to claim 1, wherein the filters of different colors of the color filter overlap each other in an area overlapping the first space.

4. The transflective liquid crystal display device according to claim 1, wherein the light shielding member is composed of signal lines that are formed for respective pixel columns of a matrix arrangement of the pixels and transmit signals for driving the pixels.

5. The transflective liquid crystal display device according to claim 4, wherein:
the first substrate is provided with scan lines that are formed for respective pixel rows of the matrix arrangement of the pixels and transmit signals for selecting the pixels; and
the scan lines are laid to circumvent a space formed between the reflective electrodes in a direction of arrangement of the pixels in the pixel rows.

6. The transflective liquid crystal display device according to claim 1, wherein:
the pixels have a memory function; and
the light shielding member is formed in an intermediate wiring layer in which intermediate wiring coupling the reflective electrodes to part of a circuit of the memory function is formed, the light shielding member being made of the same material as that of the intermediate wiring.

7. The transflective liquid crystal display device according to claim 6, wherein the pixels include a memory unit that stores data.

8. The transflective liquid crystal display device according to claim 6, wherein the pixels use a memory type liquid crystal.

9. The transflective liquid crystal display device according to claim 1, wherein the liquid crystal layer includes a group of liquid crystal molecules provided between the first substrate and the second substrate, a long axis direction of the group of liquid crystal molecules being parallel to an orientation film on the first substrate side and an orientation film on the second substrate side and twisted between the first substrate and the second substrate.

10. The transflective liquid crystal display device according to claim 1, wherein a rubbing direction on the first substrate side has an angle in a range of −45 degrees to 0 degrees, 0 degrees to 45 degrees, −135 degrees to −180 degrees, or 135 degrees to 180 degrees with respect to a row direction of the plurality of pixels arranged in a matrix.

11. An electronic apparatus comprising the transflective liquid crystal display device according to claim 1.

* * * * *